United States Patent
Cavaliere et al.

(10) Patent No.: US 10,333,644 B2
(45) Date of Patent: Jun. 25, 2019

(54) ENCAPSULATING DIGITAL COMMUNICATIONS SIGNALS FOR TRANSMISSION ON AN OPTICAL LINK

(71) Applicant: Telefonaktiebolaget LM Ericsson (publ), Stockholm (SE)

(72) Inventors: Fabio Cavaliere, Pisa (IT); Giulio Bottari, Pisa (IT); Stefano Stracca, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 22 days.

(21) Appl. No.: 15/548,024

(22) PCT Filed: Mar. 4, 2015

(86) PCT No.: PCT/EP2015/054502
§ 371 (c)(1),
(2) Date: Aug. 1, 2017

(87) PCT Pub. No.: WO2016/138950
PCT Pub. Date: Sep. 9, 2016

(65) Prior Publication Data
US 2018/0034574 A1    Feb. 1, 2018

(51) Int. Cl.
*H04J 3/16* (2006.01)
*H04J 3/06* (2006.01)
*H04L 1/00* (2006.01)

(52) U.S. Cl.
CPC .......... *H04J 3/1652* (2013.01); *H04J 3/0688* (2013.01); *H04J 3/1664* (2013.01); *H04L 1/0058* (2013.01); *H04L 1/0071* (2013.01)

(58) Field of Classification Search
CPC ...... H04J 3/1652; H04J 3/1664; H04J 3/0688; H04L 1/0071; H04L 1/0058
See application file for complete search history.

(56) References Cited

U.S. PATENT DOCUMENTS 6,690,682 B1 *  2/2004  Giaretta ................. H04J 3/047
                                                341/141
7,050,468 B2 *  5/2006  Seto ....................... H04J 3/247
                                                370/503

(Continued)

OTHER PUBLICATIONS

International Search Report for International application No. PCT/EP2015/054502—dated Dec. 10, 2015.

*Primary Examiner* — Mina M Shalaby
(74) *Attorney, Agent, or Firm* — Patent Portfolio Builders, PLLC

(57) ABSTRACT

A method (10) of encapsulating digital communications signals for transmission on a communications link, comprising steps: a. receiving a first signal of a first signal type and comprising a first clock signal and receiving a second signal of a second signal type, different to the first, and comprising a second clock signal different to the first clock signal, each clock signal having a respective clock value and accuracy (12); b. obtaining the first clock signal (14); c. obtaining a difference between at least one of the clock values of the clock signals and the accuracies of the clock signals (16) and buffering the second signal for a time at least long enough to compensate for the difference (18); and d. assembling the first signal and the buffered second signal into a frame comprising an overhead and a payload comprising a first portion and a second portion, mapping the first signal into the first portion and the second signal into the second portion (20), wherein step d. is performed using the first clock signal.

20 Claims, 10 Drawing Sheets

(56) References Cited

U.S. PATENT DOCUMENTS

| | | | |
|---|---|---|---|
| 2007/0091896 A1 | 4/2007 | Liu | |
| 2007/0104485 A1* | 5/2007 | Zhang | H04J 14/0241 |
| | | | 398/69 |
| 2008/0075110 A1 | 3/2008 | Fourcand | |
| 2008/0270785 A1* | 10/2008 | Loprieno | H04L 63/0428 |
| | | | 713/150 |
| 2011/0229133 A1* | 9/2011 | Katagiri | H04J 3/07 |
| | | | 398/58 |
| 2017/0126344 A1* | 5/2017 | Park | H04L 5/02 |
| 2017/0180071 A1 | 6/2017 | Stracca et al. | |
| 2018/0034574 A1* | 2/2018 | Cavaliere | H04J 3/1652 |

\* cited by examiner

ENCAPSULATING DIGITAL COMMUNICATIONS SIGNALS FOR TRANSMISSION ON AN OPTICAL LINK

PRIORITY

This non-provisional application is a U.S. National Stage Filing under 35 U.S.C. § 371 of International Patent Application Serial No. PCT/EP2015/054502 filed Mar. 4, 2015, and entitled "Encapsulating Digital Communications Signals for Transmission on an Optical Link," which is hereby incorporated by reference in its entirety.

TECHNICAL FIELD

The invention relates to a method of encapsulating digital communications signals for transmission on an optical link, encapsulation apparatus for a communications network transmitter and a communications network transmitter.

BACKGROUND

The Mobile Backhaul, MBH, segment is the part of a communications network located between the Base Stations, BS, of a wireless communications network, located at cell sites, and the communications network core segment. In traditional radio access network, RAN, architectures, radio and baseband processing are integrated in a BS which typically outputs a Gigabit Ethernet (GbE/10 GbE) signal. GbE clients are transported across the MBH segment using microwave signals and/or over optical fibre. Wavelength division multiplexing, WDM, can be used to increase the aggregated capacity of the optical fibre, especially in situations when fibre availability is scarce or limited by topology or cost constraints.

In the Coordinated RAN, C-RAN, architecture, radio and baseband processing are separated. Remote Radio Units, RRU, which include radio, amplification/filtering, and digital-to-analogue, D/A, conversion, are located at the cell site. Digital Units, DU, for performing baseband processing, are separated from the RRUs, and are sometimes aggregated to form a DU pool. Decentralizing the DU enables improved coordination of radio capabilities across a set of RRUs, faster service delivery, and cost savings. Common Public Radio Interface, CPRI, as defined in the CPRI Specification, is the radio interface protocol widely used for IQ data transmission between RRUs and DUs.

Both RAN and C-RAN architectures can benefit from using a transport layer based on optical technologies, which ensures low propagation delays, high data throughput, and low power consumption, while being an economical choice in exploiting fibre resources. In RAN, GbE clients can be transported over optical channels, directly mapped over wavelengths or as Optical Transport Network, OTN, clients as defined in ITU-T Recommendation G.709. In C-RAN, CPRI flows can also be transported over optical channels. ITU-T has recently included CPRI as a further OTN client in an appendix to G.709. However, the actual implementation of CPRI over OTN still presents unsolved issues. A simpler alternative to OTN has been proposed in PCT/EP2014/052056 in which CPRI is mapped over WDM optical channels with no or only a small additional overhead for Operations, Administration and Maintenance, OAM, and forward error correction, FEC, purposes. This may be referred to as CPRI over WDM.

A third option is CPRI over Ethernet, CoE, which replaces a direct dedicated link between DU and RRU, using the CPRI protocol, with an Ethernet link having a CoE adapter at both the RRU and DU. There are two primary functions of a CoE adapter: implementation of the precision CoE clock; and mapping ingress CPRI basic frames received from the RRU or DU into outgoing CoE packets. The inverse mapping is applied to incoming CoE packets. CoE is appealing since it allows, in principle, management of any kind of traffic in the same Ethernet switch. However, due to the nature of Ethernet, CoE packets arrive asynchronously and some of them may be missing. Hence, a CoE Packet Buffer is needed to assemble arriving CoE packets in the order of egress from the originator. While the CoE packets arrive asynchronously at the adapter over the Ethernet interface, they must be delivered into the CPRI interface synchronously in order to be transparent to the CPRI interface. This is accomplished by transferring CPRI basic frames extracted from the CoE packets into the CPRI interface at both a precise known latency and at a clocking rate that is regulated by the local CoE clock.

SUMMARY

It is an object to provide an improved method of encapsulating digital communications signals for transmission on an optical link. It is a further object to provide an improved encapsulation apparatus for a communications network transmitter. It is a further object to provide an improved communications network transmitter.

A first aspect of the invention provides a method of encapsulating digital communications signals for transmission on a communications link. The method comprises steps a. to d. Step a. comprises receiving a first digital communications signal of a first signal type and receiving a second digital communications signal of a second signal type, different to the first signal type. The first digital communications signal comprises a first clock signal and the second digital communications signal comprises a second clock signal, different to the first clock signal. Each clock signal has a respective clock value and accuracy. Step b. comprises obtaining the first clock signal. Step c. comprises obtaining a difference between at least one of the clock values of the first and second clock signals and the accuracies of the first and second clock signals. Step b. also comprises buffering the second digital communications signal for a time at least long enough to compensate for the difference. Step d. comprises assembling the first digital communications signal and the buffered second digital communications signal into a frame for transmission. The frame comprises an overhead and a payload, the payload comprising a first portion and a second portion. The first digital communications signal is mapped into the first portion and the second digital communications signal is mapped into the second portion. Step d. is performed using the first clock signal.

The method may enable transmission of digital communications signals of different types, having different clock signals, in a single frame on a single carrier signal without degradation of a synchronization accuracy of the first digital communications signal. The method may enable use of a communications link used to transport digital communications signals of different types to be optimized. The frame format may enable digital communications signals of different types to be carried on a single carrier signal and may provide an overhead for both types of signal. By performing the framing using the first clock signal the frame is synchronous with the first digital communications signal, and introduction of jitter onto the first digital communications signal may be avoided.

In an embodiment, the communications link is an optical link.

The method may enable transmission of digital communications signals of different types, having different clock signals, in a single frame on a single optical channel without degradation of a synchronization accuracy of the first digital communications signal. The method may enable use of an optical link used to transport digital communications signals of different types to be optimized. The frame format may enable digital communications signals of different types to be carried on a single optical channel and may provide an overhead for both types of signal. By performing the framing using the first clock signal the frame is synchronous with the first digital communications signal, and introduction of jitter onto the first digital communications signal may be avoided.

In an embodiment, the communications link is one of a radio link and an electrical link.

In an embodiment, a plurality of digital communications signals of the first signal type are received and are mapped into the first portion of the payload. The method may enable use of a communications link used to transport digital communications signals of different types to be optimized. The method may enable use of the traffic capacity of a carrier signal to be optimized.

In an embodiment, a plurality of digital communications signals of the second signal type are received and are mapped into the second portion of the payload. The method may enable use of a communications link used to transport digital communications signals of different types to be optimized. The method may enable use of the traffic capacity of a carrier signal to be optimized.

In an embodiment, at least some of the digital communications signals have different traffic bit rates. Each of the digital communications signals of the first signal type comprises the first clock signal and each of the digital communications signals of the second signal type comprises the second clock signal. The method may enable use of a communications link used to transport digital communications signals of different types to be optimized. The method may enable use of the traffic capacity of a carrier signal to be optimized.

In an embodiment, each digital communications signal of the first signal type has the same traffic bit rate and each second digital communications signal of the second signal type has the same traffic bit rate, different to the traffic bit rate of the digital communications signal of the first signal type. The method may enable use of a communications link used to transport digital communications signals of different types to be optimized. The method may enable use of the traffic capacity of a carrier signal to be optimized.

In an embodiment, at least two communications signals of the first signal type are received, a first of said signals having a first traffic bit rate and a second of said signals having a second traffic bit rate, different to the first traffic bit rate. The method may enable use of a communications link used to transport digital communications signals of different types to be optimized. The method may enable use of the traffic capacity of a carrier signal to be optimized.

In an embodiment, at least two communications signals of the second signal type are received, a first of said signals having a third traffic bit rate and a second of said signals having a fourth traffic bit rate, different to the third traffic bit rate. The method may enable use of a communications link used to transport digital communications signals of different types to be optimized. The method may enable use of the traffic capacity of a carrier signal to be optimized.

In an embodiment, the frame comprises at least three timeslots. The first portion of the payload comprising at least a first timeslot. The second portion of the payload comprising at least a second timeslot. The overhead comprises a third timeslot. The frame may provide an overhead for both types of signal.

In an embodiment, the frame comprises at least four timeslots. The payload also comprises a fourth timeslot for receiving at least one of control characters and bits of a said digital communications signal which cannot be mapped within a capacity of a respective one of the first portion and the second portion. Providing a timeslot for receiving control characters and/or bits which cannot be mapped into the capacity of the respective portion may optimize the amount of communications traffic which may be mapped into the frame and may provide flexibility in the choice of digital communications signals which may be mapped into the frame.

In an embodiment, the method comprises allocating timeslots to the first portion and the second portion of the payload in proportion to a respective weight of traffic of the communications signals of each of said signal types.

In an embodiment, the method comprises determining the number of timeslots to be allocated to each of the first portion and the second portion in proportion to a respective weight of traffic of the communications signals of each of said signal types.

In an embodiment, the method comprises determining which timeslots to allocate to each of the first portion and the second portion in proportion to a respective weight of traffic of the communications signals of each of said signal types.

In an embodiment, the method comprises allocating timeslots to the first portion and the second portion of the payload depending a network configuration of a communications network comprising the optical link and the relative weight of traffic of the communications signals of each of said signal types.

In an embodiment, each said first digital communications signal has a first latency requirement and each said second digital communications signal has a second latency requirement, less stringent than the first latency requirement. The method may enable transmission of digital communications signals having different latency requirements in a single frame on a single optical channel without degradation of the synchronization accuracy of the signal with the more stringent latency requirement. By enabling the transport of signals having different latency requirements using the same optical channel, the method may optimize the use of fibre infrastructure where used to transport both types of signal. Compared to the OTN client agnostic multiplexing based on ODUflex, the method does not introduce additional impairments on latency sensitive traffic. The advantages which the method may provide with respect to CoE are the absence of buffers (i.e. delay) on the latency sensitive signals and the absence of lost traffic. By performing the framing using the first clock signal the frame is synchronous with the first digital communications signal, and introduction of jitter onto the more sensitive first digital communications signal may be avoided.

In an embodiment, each said first digital communications signal is a continuous bit rate signal and each said second digital communications signal is a packet signal. The method may enable transmission of continuous bit rate, CBR, signals and packet signals in a single frame on a single optical channel without degradation of the synchronization accuracy of the continuous bit rate signal. By enabling the transport of CBR signals and packet signals using the same optical channel, the method may optimize the use of fibre infrastructure where used to transport both types of signal. Compared to the OTN client agnostic multiplexing based on ODUflex, the method does not introduce additional impairments on performance sensitive CBR traffic while the impact on packet traffic, due to buffers, is expected to be tolerable, due to the inherent statistical nature of packet traffic. The advantages which the method may provide with respect to CoE are the absence of buffers (i.e. delay) on the CBR signals and the absence of lost CBR traffic. By performing the framing using the first clock signal the frame is synchronous with the CBR signal, and introduction of jitter onto the CBR signal may be avoided.

In an embodiment, each said first digital communications signal is a common public radio interface, CPRI, signal as defined in the CPRI Specification and each said second digital communications signal is an Ethernet signal as defined in IEEE 802.3.

The method may enable framing of Ethernet, including Gigabit Ethernet, signals and CPRI signals together into a single frame, for transmission on a single optical channel without degradation of the synchronization accuracy of the CPRI signal. The method may provide a unified transport method for mixing traffic originating from traditional radio base stations, BS, and remote radio units, RRU. By enabling the transport of Ethernet traffic and CPRI traffic in the same optical channel, the method may optimize the use of the optical channel capacity and may thus optimise the use of fibre infrastructure for transporting fronthaul traffic (CPRI) and conventional backhaul traffic (GbE/10 GbE). This may provide an advantage with respect to CPRI over WDM and CPRI over OTN using BMP, since it may enable problems of fibre scarcity in this network segment to be overcome and it may reduce leased fibre costs. The CPRI Specification sets stringent constraints for latency, jitter and delay symmetry in downstream and upstream. By performing the framing using the CPRI clock signal the frame is synchronous with the CPRI signal, and introduction of jitter onto the CPRI signal may be avoided. Compared to the OTN client agnostic multiplexing based on ODUflex, the method does not introduce additional impairments on performance sensitive CPRI traffic while the impact on Ethernet packets, due to buffers, is expected to be tolerable, due to the inherent statistical nature of Ethernet packets. The advantages which the method may provide with respect to CoE are the absence of buffers (i.e. delay) on the CPRI signals and the absence of lost CPRI traffic, which can compromise the target $10^{-12}$ bit error rate, BER. Moreover, the method may avoid the need for additional mechanisms to manage network synchronization.

The method is applicable to present optical rates, i.e. around 10 Gbps, and may be extended with increasing benefits to higher bit rates, i.e. 40 Gbps and 100 Gbps.

In an embodiment, each digital communications signal of the first signal type is mapped into the first portion of the frame using the following steps i. to v. Step i. comprises performing data recovery on each digital communications signal of the first signal type to obtain line coded digital communications traffic. Step ii. comprises decoding the input digital communications traffic to obtain information bits and non-information bits. Step iii. comprises removing the non-information bits. Step iv. comprises adding service channel bits for monitoring or maintenance, and step v. comprises mapping the service channel bits and information bits into the first portion of the frame. Each of steps ii. to v. is performed using the first clock signal. Each digital communications signal of the second signal type is mapped into the second portion of the frame using the Generic Framing Procedure, GFP, according to ITU-T Recommendation G.7041. Removing the non-information bits from each digital communications signal of the first type makes capacity available to add the service channel bits, so a service channel for monitoring or maintenance may be added to the received digital communications signals. The method may enable a 'light optical transport layer' to be added to digital communications traffic client signals without one or more of the disadvantages of standard OTN framing.

In an embodiment, the first clock signal is obtained by performing clock recovery in step i.

In an embodiment, the first clock signal is obtained from a digital unit which transmitted the digital communications signal of the first signal type.

In an embodiment, the fourth timeslot is for receiving at least one of CPRI control characters and bits of a said Ethernet signal which cannot be mapped within a capacity of the second portion. The frame structure may enable CPRI signal control characters and bits of an Ethernet signal which cannot be mapped into the capacity of the second portion to be mapped into the allocated timeslot. By enabling the transport of Ethernet traffic and CPRI traffic in the same optical channel, and providing an allocated timeslot for CPRI control characters and Ethernet bits beyond the capacity of the second portion, the method may optimize the use of the optical channel capacity and may thus optimise the use of fibre infrastructure for transporting fronthaul traffic (CPRI) and conventional backhaul traffic (GbE/10 GbE).

In an embodiment, the method comprises providing a forward error correction code and service channel bits for each of the communications signals in the overhead. The same forward error correction code may be provided for both the communications signals of the first type and the communications signals of the second type, or a first forward error correction code may be provided for the communications signals of the first type and a second forward error correction code for the communications signals of the second type. The frame may therefore carry FEC and OAM for both types of signal.

In an embodiment, the forward error correction code is a Reed-Solomon (255, 239) forward error correction code having a plurality of interleaved codecs proportional to a preselected latency value. The method may therefore use a forward error correction, FEC, scheme which complies with the ITU-T G.709 standard for OTN but which has a lower latency, acceptable for CPRI signals.

In an embodiment, the method comprises calculating respective bit-interleaved parity, BIP, bytes for the whole payload including both communications signals of the first and second type.

In an embodiment, the time for which each second communications signal is buffered for is set using a local clock.

In an embodiment, the method comprises receiving a value of a delay applied at another location in a communications network comprising the optical link. The time for which each second communications signal is buffered for is adjusted in proportion to said delay.

In an embodiment, the value of said delay is received in a precision timing protocol signal according to IEEE 1588.

A second aspect of the invention provides encapsulation apparatus for a communications network transmitter. The encapsulation apparatus comprises at least one input, a buffer and a framer. The at least one input is arranged to receive a first digital communications signal of a first signal type and a second digital communications signal of a second signal type, different to the first signal type. The first digital communications signal comprises a first clock signal and the second digital communications signal comprises a second clock signal different to the first clock signal. Each clock signal has a respective clock value and accuracy. The buffer is arranged to buffer the second digital communications signal for a time at least long enough to compensate for a difference between at least one of the clock values of the first and second clock signals and the accuracies of the first and second clock signals. The framer is arranged to receive the first digital communications signal and to receive the buffered second digital communications signal from the buffer. The framer is arranged to frame the first digital communications signal and the buffered second digital communications signal into a frame for transmission. The frame comprises an overhead and a payload, which comprising a first portion and a second portion. The framer is arranged to map the first digital communications signal into the first portion and being arranged to map the buffered second digital communications signal into the second portion. The encapsulation apparatus is arranged to obtain the first clock signal and the framer is arranged to operate using the first clock signal.

The apparatus may enable digital communications signals of different types, having different clock signals, to be framed in a single frame for transmission on a single carrier signal without degradation of a synchronization accuracy of the first digital communications signal. This may enable use of a communications link used to transport digital communications signals of different types to be optimized. The frame format may enable digital communications signals of different types to be carried on a single carrier signal and may provide an overhead for both types of signal. By performing the framing using the first clock signal the frame is synchronous with the first digital communications signal, and introduction of jitter onto the first digital communications signal may be avoided.

In an embodiment, the encapsulation apparatus is for an optical communications network transmitter.

The apparatus may enable digital communications signals of different types, having different clock signals, to be framed in a single frame for transmission on a single optical channel without degradation of a synchronization accuracy of the first digital communications signal. This may enable use of an optical link used to transport digital communications signals of different types to be optimized. The frame format may enable digital communications signals of different types to be carried on a single optical carrier and may provide an overhead for both types of signal. By performing the framing using the first clock signal the frame is synchronous with the first digital communications signal, and introduction of jitter onto the first digital communications signal may be avoided.

In an embodiment, the encapsulation apparatus is for radio communications network transmitter.

In an embodiment, the encapsulation apparatus is for an electrical communications network transmitter.

In an embodiment, the input is arranged to receive a plurality of digital communications signals of the first signal type. The framer is arranged to map said plurality of digital communications signals of the first signal type into the first portion of the payload. The apparatus may enable use of a communications link used to transport digital communications signals of different types to be optimized. The apparatus may enable use of the traffic capacity of a carrier signal to be optimized.

In an embodiment, the input is arranged to receive a plurality of digital communications signals of the second signal type. The framer is arranged to map said plurality of digital communications signals of the second signal type into the second portion of the payload. The apparatus may enable use of a communications link used to transport digital communications signals of different types to be optimized. The apparatus may enable use of the traffic capacity of a carrier signal to be optimized.

In an embodiment, at least some of the digital communications signals have different traffic bit rates. Each of the digital communications signals of the first signal type comprises the first clock signal and each of the digital communications signals of the second signal type comprises the second clock signal. The apparatus may enable use of a communications link used to transport digital communications signals of different types to be optimized. The apparatus may enable use of the traffic capacity of a carrier signal to be optimized.

In an embodiment, each digital communications signal of the first signal type has the same traffic bit rate and each second digital communications signal of the second signal type has the same traffic bit rate, different to the traffic bit rate of the digital communications signal of the first signal type. The apparatus may enable use of a communications link used to transport digital communications signals of different types to be optimized. The apparatus may enable use of the traffic capacity of a carrier signal to be optimized.

In an embodiment, at least two communications signals of the first signal type are received, a first of said signals having a first traffic bit rate and a second of said signals having a second traffic bit rate, different to the first traffic bit rate. The apparatus may enable use of a communications link used to transport digital communications signals of different types to be optimized. The apparatus may enable use of the traffic capacity of a carrier signal to be optimized.

In an embodiment, at least two communications signals of the second signal type are received, a first of said signals having a third traffic bit rate and a second of said signals having a fourth traffic bit rate, different to the third traffic bit rate. The apparatus may enable use of a communications link used to transport digital communications signals of different types to be optimized. The apparatus may enable use of the traffic capacity of a carrier signal to be optimized.

In an embodiment, the frame comprises at least three timeslots. The first portion of the payload comprising at least a first timeslot. The second portion of the payload comprising at least a second timeslot. The overhead comprises a third timeslot. The frame may provide an overhead for both types of signal.

In an embodiment, the frame comprises at least four timeslots. The payload also comprises a fourth timeslot for receiving at least one of control characters and bits of a said digital communications signal which cannot be mapped within a capacity of a respective one of the first portion and the second portion. Providing a timeslot for receiving control characters and/or bits which cannot be mapped into the capacity of the respective portion may optimize the amount of communications traffic which may be mapped into the frame and may provide flexibility in the choice of digital communications signals which may be mapped into the frame.

In an embodiment, each said first digital communications signal has a first latency requirement and each said second digital communications signal has a second latency requirement, less stringent than the first latency requirement. The apparatus may enable digital communications signals having different latency requirements to be framed in a single frame for transmission on a single optical channel without degradation of the synchronization accuracy of the signal with the more stringent latency requirement. By enabling the transport of signals having different latency requirements using the same optical channel, the apparatus may optimize the use of fibre infrastructure where used to transport both types of signal. Compared to the OTN client agnostic multiplexing based on ODUflex, the apparatus does not introduce additional impairments on latency sensitive traffic. The advantages which the apparatus may provide with respect to CoE are the absence of buffers (i.e. delay) on the latency sensitive signals and the absence of lost traffic. By performing the framing using the first clock signal the frame is synchronous with the first digital communications signal, and introduction of jitter onto the more sensitive first digital communications signal may be avoided.

In an embodiment, each said first digital communications signal is a continuous bit rate signal and each said second digital communications signal is a packet signal. The apparatus may enable of continuous bit rate, CBR, signals and packet signals to be framed in a single frame for transmission on a single optical channel without degradation of the synchronization accuracy of the CBR signal. By enabling the transport of CBR signals and packet signals using the same optical channel, the apparatus may optimize the use of fibre infrastructure where used to transport both types of signal. Compared to the OTN client agnostic multiplexing based on ODUflex, the apparatus does not introduce additional impairments on performance sensitive CBR traffic. The advantages which the apparatus may provide with respect to CoE are the absence of buffers (i.e. delay) on the CBR signals and the absence of lost CBR traffic. By performing the framing using the first clock signal the frame is synchronous with the CBR signal, and introduction of jitter onto CBR signal may be avoided.

In an embodiment, each said first digital communications signal is a common public radio interface, CPRI, signal as defined in the CPRI Specification and each said second digital communications signal is an Ethernet signal, as defined in IEEE 802.3.

The apparatus may enable framing of Ethernet, including Gigabit Ethernet, signals and CPRI signals together into a single frame, for transmission on a single optical channel without degradation of the synchronization accuracy of the CPRI signal. The apparatus may provide a unified transport approach, mixing traffic originating from traditional radio base stations, BS, and remote radio units, RRU. By enabling the transport of Ethernet traffic and CPRI traffic in the same optical channel, the apparatus may optimize the use of the optical channel capacity and may thus optimise the use of fibre infrastructure for transporting fronthaul traffic (CPRI) and conventional backhaul traffic (GbE/10 GbE). This may provide an advantage with respect to CPRI over WDM and CPRI over OTN using BMP, since it may enable problems of fibre scarcity in this network segment to be overcome and it may reduce leased fibre costs. The CPRI Specification sets stringent constraints for latency, jitter and delay symmetry in downstream and upstream. By performing the framing using the CPRI clock signal the frame is synchronous with the CPRI signal, and introduction of jitter onto the CPRI signal may be avoided. Compared to the OTN client agnostic multiplexing based on ODUflex, the apparatus does not introduce additional impairments on performance sensitive CPRI traffic while the impact on Ethernet packets, due to buffers, is expected to be tolerable, due to the inherent statistical nature of Ethernet packets. The advantages which the apparatus may provide with respect to CoE are the absence of buffers (i.e. delay) on the CPRI signals and the absence of lost CPRI traffic, which can compromise the target $10^{-12}$ bit error rate, BER. Moreover, the apparatus may avoid the need for additional mechanisms to manage network synchronization.

The apparatus is operable with present optical rates, i.e. around 10 Gbps, and may be extended with increasing benefits to higher bit rates, i.e. 40 Gbps and 100 Gbps.

In an embodiment, the framer is arranged to map each digital communications signal of the first signal type into the first portion of the frame using the following steps i. to v. Step i. comprises performing data recovery on each digital communications signal of the first signal type to obtain line coded digital communications traffic. Step ii. comprises decoding the input digital communications traffic to obtain information bits and non-information bits. Step iii. comprises removing the non-information bits. Step iv. comprises adding service channel bits for monitoring or maintenance, and step v. comprises mapping the service channel bits and information bits into the first portion of the frame. Each of steps ii. to v. is performed using the first clock signal. The framer is arranged to map each digital communications signal of the second signal type into the second portion of the frame using the Generic Framing Procedure, GFP, according to ITU-T Recommendation G.7041. Removing the non-information bits from each digital communications signal of the first type makes capacity available to add the service channel bits, so a service channel for monitoring or maintenance may be added to the received digital communications signals. The method may enable a 'light optical transport layer' to be added to digital communications traffic client signals without one or more of the disadvantages of standard OTN framing.

In an embodiment, the framer is arranged to map at least one of CPRI control characters and bits of a said Ethernet signal which cannot be mapped within a capacity of the second portion into the fourth timeslot. The frame structure may enable CPRI signal control characters and bits of an Ethernet signal which cannot be mapped into the capacity of the second portion to be mapped into the allocated timeslot. By enabling the transport of Ethernet traffic and CPRI traffic in the same optical channel, and providing an allocated timeslot for CPRI control characters and Ethernet bits beyond the capacity of the second portion, the apparatus may optimize the use of the optical channel capacity and may thus optimise the use of fibre infrastructure for transporting fronthaul traffic (CPRI) and conventional backhaul traffic (GbE/10 GbE).

In an embodiment, the framer is arranged to provide a forward error correction code and service channel bits for each of the communications signals in the overhead. The same forward error correction code may be provided for both the communications signals of the first type and the communications signals of the second type, or a first forward error correction code may be provided for the communications signals of the first type and a second forward error correction code for the communications signals of the second type. The frame may therefore carry FEC and OAM for both types of signal.

In an embodiment, the forward error correction code is a Reed-Solomon (255, 239) forward error correction code having a plurality of interleaved codecs proportional to a preselected latency value. The apparatus may therefore apply a forward error correction, FEC, scheme which complies with the ITU-T G.709 standard for OTN but which has a lower latency, acceptable for CPRI signals.

In an embodiment, the framer is arranged to calculate respective bit-interleaved parity, BIP, bytes for the payload including both communications signals of the first type and the second type.

In an embodiment, the buffer is arranged to operate using a local clock.

In an embodiment, the apparatus is arranged to receive a value of a delay applied at another location in a communications network comprising the optical link. The time for which each second communications signal is buffered for is adjusted in proportion to said delay.

In an embodiment, the value of said delay is received in a precision timing protocol signal according to IEEE 1588.

A third aspect of the invention provides a communications network transmitter comprising encapsulation apparatus and a carrier signal transmitter arranged to generate and transmit a carrier signal carrying the frame for transmission. The encapsulation apparatus comprises at least one input, a buffer and a framer. The at least one input is arranged to receive a first digital communications signal of a first signal type and a second digital communications signal of a second signal type, different to the first signal type. The first digital communications signal comprises a first clock signal and the second digital communications signal comprises a second clock signal different to the first clock signal. Each clock signal has a respective clock value and accuracy. The buffer is arranged to buffer the second digital communications signal for a time at least long enough to compensate for a difference between at least one of the clock values of the first and second clock signals and the accuracies of the first and second clock signals. The framer is arranged to receive the first digital communications signal and to receive the buffered second digital communications signal from the buffer. The framer is arranged to frame the first digital communications signal and the buffered second digital communications signal into a frame for transmission. The frame comprises an overhead and a payload, which comprising a first portion and a second portion. The framer is arranged to map the first digital communications signal into the first portion and being arranged to map the buffered second digital communications signal into the second portion. The encapsulation apparatus is arranged to obtain the first clock signal and the framer is arranged to operate using the first clock signal.

The encapsulation apparatus may enable digital communications signals of different types, having different clock signals, to be framed in a single frame for transmission on a single carrier signal without degradation of a synchronization accuracy of the first digital communications signal. Use of the communications network transmitter may enable use of a communications link used to transport digital communications signals of different types to be optimized. The frame format may enable digital communications signals of different types to be carried on a single carrier signal and may provide an overhead for both types of signal. By performing the framing using the first clock signal the frame is synchronous with the first digital communications signal, and introduction of jitter onto the first digital communications signal may be avoided.

In an embodiment, the carrier signal transmitter is an optical transmitter for generating an optical carrier signal.

The encapsulation apparatus may enable digital communications signals of different types, having different clock signals, to be framed in a single frame for transmission on a single optical carrier signal, also known as an "optical channel", without degradation of a synchronization accuracy of the first digital communications signal. Use of the communications network transmitter may enable use of an optical link used to transport digital communications signals of different types to be optimized. The frame format may enable digital communications signals of different types to be carried on a single optical channel and may provide an overhead for both types of signal. By performing the framing using the first clock signal the frame is synchronous with the first digital communications signal, and introduction of jitter onto the first digital communications signal may be avoided.

In an embodiment, the carrier signal transmitter is a radio transmitter for generating a radio frequency carrier signal.

In an embodiment, the carrier signal transmitter is an electrical signal transmitter for generating an electrical carrier signal.

In an embodiment, the input is arranged to receive a plurality of digital communications signals of the first signal type. The framer is arranged to map said plurality of digital communications signals of the first signal type into the first portion of the payload. The communications network transmitter may enable use of a communications link used to transport digital communications signals of different types to be optimized. The communications network transmitter may enable use of the traffic capacity of a carrier signal to be optimized.

In an embodiment, the input is arranged to receive a plurality of digital communications signals of the second signal type. The framer is arranged to map said plurality of digital communications signals of the second signal type into the second portion of the payload. The communications network transmitter may enable use of a communications link used to transport digital communications signals of different types to be optimized. The communications network transmitter may enable use of the traffic capacity of a carrier signal to be optimized.

In an embodiment, at least some of the digital communications signals have different traffic bit rates. Each of the digital communications signals of the first signal type comprises the first clock signal and each of the digital communications signals of the second signal type comprises the second clock signal. The transmitter may enable use of a communications link used to transport digital communications signals of different types to be optimized. The communications network transmitter may enable use of the traffic capacity of a carrier signal to be optimized.

In an embodiment, each digital communications signal of the first signal type has the same traffic bit rate and each second digital communications signal of the second signal type has the same traffic bit rate, different to the traffic bit rate of the digital communications signal of the first signal type. The communications network transmitter may enable use of a communications link used to transport digital communications signals of different types to be optimized. The communications network transmitter may enable use of the traffic capacity of a carrier signal to be optimized.

In an embodiment, at least two communications signals of the first signal type are received, a first of said signals having a first traffic bit rate and a second of said signals having a second traffic bit rate, different to the first traffic bit rate. The communications network transmitter may enable use of a communications link used to transport digital communications signals of different types to be optimized. The communications network transmitter may enable use of the traffic capacity of a carrier signal to be optimized.

In an embodiment, at least two communications signals of the second signal type are received, a first of said signals having a third traffic bit rate and a second of said signals having a fourth traffic bit rate, different to the third traffic bit rate. The communications network transmitter may enable use of a communications link used to transport digital communications signals of different types to be optimized. The communications network transmitter may enable use of the traffic capacity of a carrier signal to be optimized.

In an embodiment, the frame comprises at least three timeslots. The first portion of the payload comprising at least a first timeslot. The second portion of the payload comprising at least a second timeslot. The overhead comprises a third timeslot. The frame may provide an overhead for both types of signal.

In an embodiment, the frame comprises at least four timeslots. The payload also comprises a fourth timeslot for receiving at least one of control characters and bits of a said digital communications signal which cannot be mapped within a capacity of a respective one of the first portion and the second portion. Providing a timeslot for receiving control characters and/or bits which cannot be mapped into the capacity of the respective portion may optimize the amount of communications traffic which may be mapped into the frame and may provide flexibility in the choice of digital communications signals which may be mapped into the frame.

In an embodiment, each said first digital communications signal has a first latency requirement and each said second digital communications signal has a second latency requirement, less stringent than the first latency requirement. The apparatus may enable digital communications signals having different latency requirements to be framed in a single frame for transmission on a single optical channel without degradation of the synchronization accuracy of the signal with the more stringent latency requirement. By enabling the transport of signals having different latency requirements using the same optical channel, the transmitter may optimize the use of fibre infrastructure where used to transport both types of signal. Compared to the OTN client agnostic multiplexing based on ODUflex, the transmitter does not introduce additional impairments on latency sensitive traffic. The advantages which the apparatus may provide with respect to CoE are the absence of buffers (i.e. delay) on the latency sensitive signals and the absence of lost traffic. By performing the framing using the first clock signal the frame is synchronous with the first digital communications signal, and introduction of jitter onto the more sensitive first digital communications signal may be avoided.

In an embodiment, each said first digital communications signal is a continuous bit rate signal and each said second digital communications signal is a packet signal. The encapsulation apparatus may enable of continuous bit rate, CBR, signals and packet signals to be framed in a single frame for transmission on a single optical channel without degradation of the synchronization accuracy of the CBR signal. By enabling the transport of CBR signals and packet signals using the same optical channel, the transmitter may optimize the use of fibre infrastructure where used to transport both types of signal. Compared to the OTN client agnostic multiplexing based on ODUflex, the encapsulation apparatus does not introduce additional impairments on performance sensitive CBR traffic. The advantages which the encapsulation apparatus may provide with respect to CoE are the absence of buffers (i.e. delay) on the CBR signals and the absence of lost CBR traffic. By performing the framing using the first clock signal the frame is synchronous with the CBR signal, and introduction of jitter onto CBR signal may be avoided.

In an embodiment, each said first digital communications signal is a common public radio interface, CPRI, signal as defined in the CPRI Specification and each said second digital communications signal is an Ethernet signal, as defined in IEEE 802.3.

The communications network transmitter may enable framing of Ethernet, including Gigabit Ethernet, signals and CPRI signals together into a single frame, and transmission of the framed signals on a single optical channel without degradation of the synchronization accuracy of the CPRI signal. The communications network transmitter may provide a unified transport approach, mixing traffic originating from traditional radio base stations, BS, and remote radio units, RRU. By enabling the transport of Ethernet traffic and CPRI traffic in the same optical channel, the communications network transmitter may optimize the use of the optical channel capacity and may thus optimise the use of fibre infrastructure for transporting fronthaul traffic (CPRI) and conventional backhaul traffic (GbE/10 GbE). This may provide an advantage with respect to CPRI over WDM and CPRI over OTN using BMP, since it may enable problems of fibre scarcity in this network segment to be overcome and it may reduce leased fibre costs. The CPRI Specification sets stringent constraints for latency, jitter and delay symmetry in downstream and upstream. By performing the framing using the CPRI clock signal the frame is synchronous with the CPRI signal, and introduction of jitter onto the CPRI signal may be avoided. Compared to the OTN client agnostic multiplexing based on ODUflex, the encapsulation apparatus does not introduce additional impairments on performance sensitive CPRI traffic while the impact on Ethernet packets, due to buffers, is expected to be tolerable, due to the inherent statistical nature of Ethernet packets. The advantages which the encapsulation apparatus may provide with respect to CoE are the absence of buffers (i.e. delay) on the CPRI signals and the absence of lost CPRI traffic, which can compromise the target $10^{-12}$ bit error rate, BER. Moreover, the communications network transmitter may avoid the need for additional mechanisms to manage network synchronization.

The communications network transmitter is operable with present optical rates, i.e. around 10 Gbps, and may be extended with increasing benefits to higher bit rates, i.e. 40 Gbps and 100 Gbps.

In an embodiment, the framer is arranged to map each digital communications signal of the first signal type into the first portion of the frame using the following steps i. to v. Step i. comprises performing data recovery on each digital communications signal of the first signal type to obtain line coded digital communications traffic. Step ii. comprises decoding the input digital communications traffic to obtain information bits and non-information bits. Step iii. comprises removing the non-information bits. Step iv. comprises adding service channel bits for monitoring or maintenance, and step v. comprises mapping the service channel bits and information bits into the first portion of the frame. Each of steps ii. to v. is performed using the first clock signal. The framer is arranged to map each digital communications signal of the second signal type into the second portion of the frame using the Generic Framing Procedure, GFP, according to ITU-T Recommendation G.7041. Removing the non-information bits from each digital communications signal of the first type makes capacity available to add the service channel bits, so a service channel for monitoring or maintenance may be added to the received digital communications signals. The method may enable a 'light optical transport layer' to be added to digital communications traffic client signals without one or more of the disadvantages of standard OTN framing.

In an embodiment, the framer is arranged to map at least one of CPRI control characters and bits of a said Ethernet signal which cannot be mapped within a capacity of the second portion into the fourth timeslot. The frame structure may enable CPRI signal control characters and bits of an Ethernet signal which cannot be mapped into the capacity of the second portion to be mapped into the allocated timeslot. By enabling the transport of Ethernet traffic and CPRI traffic in the same optical channel, and providing an allocated timeslot for CPRI control characters and Ethernet bits beyond the capacity of the second portion, the transmitter may optimize the use of the optical channel capacity and may thus optimise the use of fibre infrastructure for transporting fronthaul traffic (CPRI) and conventional backhaul traffic (GbE/10 GbE).

In an embodiment, the framer is arranged to provide a forward error correction code and service channel bits for each of the communications signals in the overhead. The same forward error correction code may be provided for both the communications signals of the first type and the communications signals of the second type, or a first forward error correction code may be provided for the communications signals of the first type and a second forward error correction code for the communications signals of the second type. The frame may therefore carry FEC and OAM for both types of signal.

In an embodiment, the forward error correction code is a Reed-Solomon (255, 239) forward error correction code having a plurality of interleaved codecs proportional to a preselected latency value. The communications network transmitter may therefore apply a forward error correction, FEC, scheme which complies with the ITU-T G.709 standard for OTN but which has a lower latency, acceptable for CPRI signals.

In an embodiment, the framer is arranged to calculate respective bit-interleaved parity, BIP, bytes for the payload including both communications signals of the first type and the second type.

In an embodiment, the buffer is arranged to operate using a local clock.

In an embodiment, the communications network transmitter is arranged to receive a value of a delay applied at another location in a communications network comprising the optical link. The time for which each second communications signal is buffered for is adjusted in proportion to said delay.

In an embodiment, the value of said delay is received in a precision timing protocol signal according to IEEE 1588.

A fourth aspect of the invention provides a communications network node comprising a communications network transmitter. The communications network transmitter comprises encapsulation apparatus and a carrier signal transmitter arranged to generate and transmit a carrier signal carrying the frame for transmission. The encapsulation apparatus comprises at least one input, a buffer and a framer. The at least one input is arranged to receive a first digital communications signal of a first signal type and a second digital communications signal of a second signal type, different to the first signal type. The first digital communications signal comprises a first clock signal and the second digital communications signal comprises a second clock signal different to the first clock signal. Each clock signal has a respective clock value and accuracy. The buffer is arranged to buffer the second digital communications signal for a time at least long enough to compensate for a difference between at least one of the clock values of the first and second clock signals and the accuracies of the first and second clock signals. The framer is arranged to receive the first digital communications signal and to receive the buffered second digital communications signal from the buffer. The framer is arranged to frame the first digital communications signal and the buffered second digital communications signal into a frame for transmission. The frame comprises an overhead and a payload, which comprising a first portion and a second portion. The framer is arranged to map the first digital communications signal into the first portion and being arranged to map the buffered second digital communications signal into the second portion. The encapsulation apparatus is arranged to obtain the first clock signal and the framer is arranged to operate using the first clock signal.

The encapsulation apparatus may enable digital communications signals of different types, having different clock signals, to be framed in a single frame for transmission on a single carrier signal without degradation of a synchronization accuracy of the first digital communications signal. Use of the communications network transmitter may enable use of a communications link used to transport digital communications signals of different types to be optimized. The frame format may enable digital communications signals of different types to be carried on a single carrier signal and may provide an overhead for both types of signal. By performing the framing using the first clock signal the frame is synchronous with the first digital communications signal, and introduction of jitter onto the first digital communications signal may be avoided.

In an embodiment, the carrier signal transmitter is an optical transmitter arranged to generate and transmit an optical signal carrying the frame for transmission.

The encapsulation apparatus may enable digital communications signals of different types, having different clock signals, to be framed in a single frame for transmission on a single optical channel without degradation of a synchronization accuracy of the first digital communications signal. Use of the communications network transmitter may enable use of a communications link used to transport digital communications signals of different types to be optimized. The frame format may enable digital communications signals of different types to be carried on a single optical channel and may provide an overhead for both types of signal. By performing the framing using the first clock signal the frame is synchronous with the first digital communications signal, and introduction of jitter onto the first digital communications signal may be avoided.

In an embodiment, the carrier signal transmitter is a radio transmitter arranged to generate and transmit a radio frequency carrier signal carrying the frame for transmission.

In an embodiment, the carrier signal transmitter is an electrical signal transmitter arranged to generate and transmit an electrical carrier signal carrying the frame for transmission.

In an embodiment, the input is arranged to receive a plurality of digital communications signals of the first signal type. The framer is arranged to map said plurality of digital communications signals of the first signal type into the first portion of the payload. The communications network transmitter may enable use of a communications link used to transport digital communications signals of different types to be optimized. The communications network transmitter may enable use of the traffic capacity of a carrier signal to be optimized.

In an embodiment, the input is arranged to receive a plurality of digital communications signals of the second signal type. The framer is arranged to map said plurality of digital communications signals of the second signal type into the second portion of the payload. The communications network transmitter may enable use of a communications link used to transport digital communications signals of different types to be optimized. The communications network transmitter may enable use of the traffic capacity of a carrier signal to be optimized.

In an embodiment, at least some of the digital communications signals have different traffic bit rates. Each of the digital communications signals of the first signal type comprises the first clock signal and each of the digital communications signals of the second signal type comprises the second clock signal. The communications network transmitter may enable use of a communications link used to transport digital communications signals of different types to be optimized. The communications network transmitter may enable use of the traffic capacity of a carrier signal to be optimized.

In an embodiment, each digital communications signal of the first signal type has the same traffic bit rate and each second digital communications signal of the second signal type has the same traffic bit rate, different to the traffic bit rate of the digital communications signal of the first signal type. The communications network transmitter may enable use of a communications link used to transport digital communications signals of different types to be optimized. The communications network transmitter may enable use of the traffic capacity of a carrier signal to be optimized.

In an embodiment, at least two communications signals of the first signal type are received, a first of said signals having a first traffic bit rate and a second of said signals having a second traffic bit rate, different to the first traffic bit rate. The communications network transmitter may enable use of a communications link used to transport digital communications signals of different types to be optimized. The communications network transmitter may enable use of the traffic capacity of a carrier signal to be optimized.

In an embodiment, at least two communications signals of the second signal type are received, a first of said signals having a third traffic bit rate and a second of said signals having a fourth traffic bit rate, different to the third traffic bit rate. The communications network transmitter may enable use of a communications link used to transport digital communications signals of different types to be optimized. The communications network transmitter may enable use of the traffic capacity of a carrier signal to be optimized.

In an embodiment, the frame comprises at least three timeslots. The first portion of the payload comprising at least a first timeslot. The second portion of the payload comprising at least a second timeslot. The overhead comprises a third timeslot. The frame may provide an overhead for both types of signal.

In an embodiment, the frame comprises at least four timeslots. The payload also comprises a fourth timeslot for receiving at least one of control characters and bits of a said digital communications signal which cannot be mapped within a capacity of a respective one of the first portion and the second portion. Providing a timeslot for receiving control characters and/or bits which cannot be mapped into the capacity of the respective portion may optimize the amount of communications traffic which may be mapped into the frame and may provide flexibility in the choice of digital communications signals which may be mapped into the frame.

In an embodiment, each said first digital communications signal has a first latency requirement and each said second digital communications signal has a second latency requirement, less stringent than the first latency requirement. The apparatus may enable digital communications signals having different latency requirements to be framed in a single frame for transmission on a single optical channel without degradation of the synchronization accuracy of the signal with the more stringent latency requirement. By enabling the transport of signals having different latency requirements using the same optical channel, the transmitter may optimize the use of fibre infrastructure where used to transport both types of signal. Compared to the OTN client agnostic multiplexing based on ODUflex, the transmitter does not introduce additional impairments on latency sensitive traffic. The advantages which the apparatus may provide with respect to CoE are the absence of buffers (i.e. delay) on the latency sensitive signals and the absence of lost traffic. By performing the framing using the first clock signal the frame is synchronous with the first digital communications signal, and introduction of jitter onto the more sensitive first digital communications signal may be avoided.

In an embodiment, each said first digital communications signal is a continuous bit rate signal and each said second digital communications signal is a packet signal. The encapsulation apparatus may enable of continuous bit rate, CBR, signals and packet signals to be framed in a single frame for transmission on a single optical channel without degradation of the synchronization accuracy of the CBR signal. By enabling the transport of CBR signals and packet signals using the same optical channel, the transmitter may optimize the use of fibre infrastructure where used to transport both types of signal. Compared to the OTN client agnostic multiplexing based on ODUflex, the encapsulation apparatus does not introduce additional impairments on performance sensitive CBR traffic. The advantages which the encapsulation apparatus may provide with respect to CoE are the absence of buffers (i.e. delay) on the CBR signals and the absence of lost CBR traffic. By performing the framing using the first clock signal the frame is synchronous with the CBR signal, and introduction of jitter onto CBR signal may be avoided.

In an embodiment, each said first digital communications signal is a common public radio interface, CPRI, signal as defined in the CPRI Specification and each said second digital communications signal is an Ethernet signal, as defined in IEEE 802.3.

The communications network transmitter may enable framing of Ethernet, including Gigabit Ethernet, signals and CPRI signals together into a single frame, and transmission of the framed signals on a single optical channel without degradation of the synchronization accuracy of the CPRI signal. The communications network transmitter may provide a unified transport approach, mixing traffic originating from traditional radio base stations, BS, and remote radio units, RRU. By enabling the transport of Ethernet traffic and CPRI traffic in the same optical channel, the communications network transmitter may optimize the use of the optical channel capacity and may thus optimise the use of fibre infrastructure for transporting fronthaul traffic (CPRI) and conventional backhaul traffic (GbE/10 GbE). This may provide an advantage with respect to CPRI over WDM and CPRI over OTN using BMP, since it may enable problems of fibre scarcity in this network segment to be overcome and it may reduce leased fibre costs. The CPRI Specification sets stringent constraints for latency, jitter and delay symmetry in downstream and upstream. By performing the framing using the CPRI clock signal the frame is synchronous with the CPRI signal, and introduction of jitter onto the CPRI signal may be avoided. Compared to the OTN client agnostic multiplexing based on ODUflex, the encapsulation apparatus does not introduce additional impairments on performance sensitive CPRI traffic while the impact on Ethernet packets, due to buffers, is expected to be tolerable, due to the inherent statistical nature of Ethernet packets. The advantages which the encapsulation apparatus may provide with respect to CoE are the absence of buffers (i.e. delay) on the CPRI signals and the absence of lost CPRI traffic, which can compromise the target $10^{-12}$ bit error rate, BER. Moreover, the transmitter may avoid the need for additional mechanisms to manage network synchronization.

The communications network transmitter is operable with present optical rates, i.e. around 10 Gbps, and may be extended with increasing benefits to higher bit rates, i.e. 40 Gbps and 100 Gbps.

In an embodiment, the framer is arranged to map each digital communications signal of the first signal type into the first portion of the frame using the following steps i. to v. Step i. comprises performing data recovery on each digital communications signal of the first signal type to obtain line coded digital communications traffic. Step ii. comprises decoding the input digital communications traffic to obtain information bits and non-information bits. Step iii. comprises removing the non-information bits. Step iv. comprises adding service channel bits for monitoring or maintenance, and step v. comprises mapping the service channel bits and information bits into the first portion of the frame. Each of steps ii. to v. is performed using the first clock signal. The framer is arranged to map each digital communications signal of the second signal type into the second portion of the frame using the Generic Framing Procedure, GFP, according to ITU-T Recommendation G.7041. Removing the non-information bits from each digital communications signal of the first type makes capacity available to add the service channel bits, so a service channel for monitoring or maintenance may be added to the received digital communications signals. The method may enable a 'light optical transport layer' to be added to digital communications traffic client signals without one or more of the disadvantages of standard OTN framing.

In an embodiment, the framer is arranged to map at least one of CPRI control characters and bits of a said Ethernet signal which cannot be mapped within a capacity of the second portion into the fourth timeslot. The frame structure may enable CPRI signal control characters and bits of an Ethernet signal which cannot be mapped into the capacity of the second portion to be mapped into the allocated timeslot. By enabling the transport of Ethernet traffic and CPRI traffic in the same optical channel, and providing an allocated timeslot for CPRI control characters and Ethernet bits beyond the capacity of the second portion, the transmitter may optimize the use of the optical channel capacity and may thus optimise the use of fibre infrastructure for transporting fronthaul traffic (CPRI) and conventional backhaul traffic (GbE/10 GbE).

In an embodiment, the framer is arranged to provide a forward error correction code and service channel bits for each of the communications signals in the overhead. The same forward error correction code may be provided for both the communications signals of the first type and the communications signals of the second type, or a first forward error correction code may be provided for the communications signals of the first type and a second forward error correction code for the communications signals of the second type. The frame may therefore carry FEC and OAM for both types of signal.

In an embodiment, the forward error correction code is a Reed-Solomon (255, 239) forward error correction code having a plurality of interleaved codecs proportional to a preselected latency value. The apparatus may therefore apply a forward error correction, FEC, scheme which complies with the ITU-T G.709 standard for OTN but which has a lower latency, acceptable for CPRI signals.

In an embodiment, the framer is arranged to calculate respective bit-interleaved parity, BIP, bytes for the payload including both communications signals of the first type and the second type.

In an embodiment, the buffer is arranged to operate using a local clock.

In an embodiment, the transmitter is arranged to receive a value of a delay applied at another location in a communications network comprising the optical link. The time for which each second communications signal is buffered for is adjusted in proportion to said delay.

In an embodiment, the value of said delay is received in a precision timing protocol signal according to IEEE 1588.

A fifth aspect of the invention provides a communications network comprising a communications network node. The communications network node comprises a communications network transmitter. The communications network transmitter comprises encapsulation apparatus and a carrier signal transmitter arranged to generate and transmit carrier signal carrying the frame for transmission. The encapsulation apparatus comprises at least one input, a buffer and a framer. The at least one input is arranged to receive a first digital communications signal of a first signal type and a second digital communications signal of a second signal type, different to the first signal type. The first digital communications signal comprises a first clock signal and the second digital communications signal comprises a second clock signal different to the first clock signal. Each clock signal has a respective clock value and accuracy. The buffer is arranged to buffer the second digital communications signal for a time at least long enough to compensate for a difference between at least one of the clock values of the first and second clock signals and the accuracies of the first and second clock signals. The framer is arranged to receive the first digital communications signal and to receive the buffered second digital communications signal from the buffer. The framer is arranged to frame the first digital communications signal and the buffered second digital communications signal into a frame for transmission. The frame comprises an overhead and a payload, which comprising a first portion and a second portion. The framer is arranged to map the first digital communications signal into the first portion and being arranged to map the buffered second digital communications signal into the second portion. The encapsulation apparatus is arranged to obtain the first clock signal and the framer is arranged to operate using the first clock signal.

The encapsulation apparatus may enable digital communications signals of different types, having different clock signals, to be framed in a single frame for transmission on a single carrier signal without degradation of a synchronization accuracy of the first digital communications signal. Use of the transmitter may enable use of a communications link used to transport digital communications signals of different types to be optimized. The frame format may enable digital communications signals of different types to be carried on a single carrier signal and may provide an overhead for both types of signal. By performing the framing using the first clock signal the frame is synchronous with the first digital communications signal, and introduction of jitter onto the first digital communications signal may be avoided.

In an embodiment, the carrier signal transmitter is an optical transmitter for generating an optical carrier signal.

The encapsulation apparatus may enable digital communications signals of different types, having different clock signals, to be framed in a single frame for transmission on a single optical carrier signal, also known as an "optical channel", without degradation of a synchronization accuracy of the first digital communications signal. Use of the communications network transmitter may enable use of an optical link used to transport digital communications signals of different types to be optimized. The frame format may enable digital communications signals of different types to be carried on a single optical channel and may provide an overhead for both types of signal. By performing the framing using the first clock signal the frame is synchronous with the first digital communications signal, and introduction of jitter onto the first digital communications signal may be avoided.

In an embodiment, the carrier signal transmitter is a radio transmitter for generating a radio frequency carrier signal.

In an embodiment, the carrier signal transmitter is an electrical signal transmitter for generating an electrical carrier signal.

In an embodiment, the input is arranged to receive a plurality of digital communications signals of the first signal type. The framer is arranged to map said plurality of digital communications signals of the first signal type into the first portion of the payload. The communications network transmitter may enable use of a communications link used to transport digital communications signals of different types to be optimized. The communications network transmitter may enable use of the traffic capacity of a carrier signal to be optimized.

In an embodiment, the input is arranged to receive a plurality of digital communications signals of the second signal type. The framer is arranged to map said plurality of digital communications signals of the second signal type into the second portion of the payload. The communications network transmitter may enable use of a communications link used to transport digital communications signals of different types to be optimized. The communications network transmitter may enable use of the traffic capacity of a carrier signal to be optimized.

In an embodiment, at least some of the digital communications signals have different traffic bit rates. Each of the digital communications signals of the first signal type comprises the first clock signal and each of the digital communications signals of the second signal type comprises the second clock signal. The transmitter may enable use of a communications link used to transport digital communications signals of different types to be optimized. The communications network transmitter may enable use of the traffic capacity of a carrier signal to be optimized.

In an embodiment, each digital communications signal of the first signal type has the same traffic bit rate and each second digital communications signal of the second signal type has the same traffic bit rate, different to the traffic bit rate of the digital communications signal of the first signal type. The communications network transmitter may enable use of a communications link used to transport digital communications signals of different types to be optimized. The communications network transmitter may enable use of the traffic capacity of a carrier signal to be optimized.

In an embodiment, at least two communications signals of the first signal type are received, a first of said signals having a first traffic bit rate and a second of said signals having a second traffic bit rate, different to the first traffic bit rate. The communications network transmitter may enable use of a communications link used to transport digital communications signals of different types to be optimized. The communications network transmitter may enable use of the traffic capacity of a carrier signal to be optimized.

In an embodiment, at least two communications signals of the second signal type are received, a first of said signals having a third traffic bit rate and a second of said signals having a fourth traffic bit rate, different to the third traffic bit rate. The communications network transmitter may enable use of a communications link used to transport digital communications signals of different types to be optimized. The communications network transmitter may enable use of the traffic capacity of a carrier signal to be optimized.

In an embodiment, the frame comprises at least three timeslots. The first portion of the payload comprising at least a first timeslot. The second portion of the payload comprising at least a second timeslot. The overhead comprises a third timeslot. The frame may provide an overhead for both types of signal.

In an embodiment, the frame comprises at least four timeslots. The payload also comprises a fourth timeslot for receiving at least one of control characters and bits of a said digital communications signal which cannot be mapped within a capacity of a respective one of the first portion and the second portion. Providing a timeslot for receiving control characters and/or bits which cannot be mapped into the capacity of the respective portion may optimize the amount of communications traffic which may be mapped into the frame and may provide flexibility in the choice of digital communications signals which may be mapped into the frame.

In an embodiment, each said first digital communications signal has a first latency requirement and each said second digital communications signal has a second latency requirement, less stringent than the first latency requirement. The apparatus may enable digital communications signals having different latency requirements to be framed in a single frame for transmission on a single optical channel without degradation of the synchronization accuracy of the signal with the more stringent latency requirement. By enabling the transport of signals having different latency requirements using the same optical channel, the transmitter may optimize the use of fibre infrastructure where used to transport both types of signal. Compared to the OTN client agnostic multiplexing based on ODUflex, the transmitter does not introduce additional impairments on latency sensitive traffic. The advantages which the apparatus may provide with respect to CoE are the absence of buffers (i.e. delay) on the latency sensitive signals and the absence of lost traffic. By performing the framing using the first clock signal the frame is synchronous with the first digital communications signal, and introduction of jitter onto the more sensitive first digital communications signal may be avoided.

In an embodiment, each said first digital communications signal is a continuous bit rate signal and each said second digital communications signal is a packet signal. The encapsulation apparatus may enable of continuous bit rate, CBR, signals and packet signals to be framed in a single frame for transmission on a single optical channel without degradation of the synchronization accuracy of the CBR signal. By enabling the transport of CBR signals and packet signals using the same optical channel, the transmitter may optimize the use of fibre infrastructure where used to transport both types of signal. Compared to the OTN client agnostic multiplexing based on ODUflex, the encapsulation apparatus does not introduce additional impairments on performance sensitive CBR traffic. The advantages which the encapsulation apparatus may provide with respect to CoE are the absence of buffers (i.e. delay) on the CBR signals and the absence of lost CBR traffic. By performing the framing using the first clock signal the frame is synchronous with the CBR signal, and introduction of jitter onto CBR signal may be avoided.

In an embodiment, each said first digital communications signal is a common public radio interface, CPRI, signal as defined in the CPRI Specification and each said second digital communications signal is an Ethernet signal, as defined in IEEE 802.3.

The communications network transmitter may enable framing of Ethernet, including Gigabit Ethernet, signals and CPRI signals together into a single frame, and transmission of the framed signals on a single optical channel without degradation of the synchronization accuracy of the CPRI signal. The communications network transmitter may provide a unified transport approach, mixing traffic originating from traditional radio base stations, BS, and remote radio units, RRU. By enabling the transport of Ethernet traffic and CPRI traffic in the same optical channel, the transmitter may optimize the use of the optical channel capacity and may thus optimise the use of fibre infrastructure for transporting fronthaul traffic (CPRI) and conventional backhaul traffic (GbE/10 GbE). This may provide an advantage with respect to CPRI over WDM and CPRI over OTN using BMP, since it may enable problems of fibre scarcity in this network segment to be overcome and it may reduce leased fibre costs. The CPRI Specification sets stringent constraints for latency, jitter and delay symmetry in downstream and upstream. By performing the framing using the CPRI clock signal the frame is synchronous with the CPRI signal, and introduction of jitter onto the CPRI signal may be avoided. Compared to the OTN client agnostic multiplexing based on ODUflex, the encapsulation apparatus does not introduce additional impairments on performance sensitive CPRI traffic while the impact on Ethernet packets, due to buffers, is expected to be tolerable, due to the inherent statistical nature of Ethernet packets. The advantages which the encapsulation apparatus may provide with respect to CoE are the absence of buffers (i.e. delay) on the CPRI signals and the absence of lost CPRI traffic, which can compromise the target $10^{-12}$ bit error rate, BER. Moreover, the communications network transmitter may avoid the need for additional mechanisms to manage network synchronization.

The communications network transmitter is operable with present optical rates, i.e. around 10 Gbps, and may be extended with increasing benefits to higher bit rates, i.e. 40 Gbps and 100 Gbps.

In an embodiment, the framer is arranged to map each digital communications signal of the first signal type into the first portion of the frame using the following steps i. to v. Step i. comprises performing data recovery on each digital communications signal of the first signal type to obtain line coded digital communications traffic. Step ii. comprises decoding the input digital communications traffic to obtain information bits and non-information bits. Step iii. comprises removing the non-information bits. Step iv. comprises adding service channel bits for monitoring or maintenance, and step v. comprises mapping the service channel bits and information bits into the first portion of the frame. Each of steps ii. to v. is performed using the first clock signal. The framer is arranged to map each digital communications signal of the second signal type into the second portion of the frame using the Generic Framing Procedure, GFP, according to ITU-T Recommendation G.7041. Removing the non-information bits from each digital communications signal of the first type makes capacity available to add the service channel bits, so a service channel for monitoring or maintenance may be added to the received digital communications signals. The method may enable a 'light optical transport layer' to be added to digital communications traffic client signals without one or more of the disadvantages of standard OTN framing.

In an embodiment, the framer is arranged to map at least one of CPRI control characters and bits of a said Ethernet signal which cannot be mapped within a capacity of the second portion into the fourth timeslot. The frame structure may enable CPRI signal control characters and bits of an Ethernet signal which cannot be mapped into the capacity of the second portion to be mapped into the allocated timeslot. By enabling the transport of Ethernet traffic and CPRI traffic in the same optical channel, and providing an allocated timeslot for CPRI control characters and Ethernet bits beyond the capacity of the second portion, the transmitter may optimize the use of the optical channel capacity and may thus optimise the use of fibre infrastructure for transporting fronthaul traffic (CPRI) and conventional backhaul traffic (GbE/10 GbE).

In an embodiment, the framer is arranged to provide a forward error correction code and service channel bits for each of the communications signals in the overhead. The same forward error correction code may be provided for both the communications signals of the first type and the communications signals of the second type, or a first forward error correction code may be provided for the communications signals of the first type and a second forward error correction code for the communications signals of the second type. The frame may therefore carry FEC and OAM for both types of signal.

In an embodiment, the forward error correction code is a Reed-Solomon (255, 239) forward error correction code having a plurality of interleaved codecs proportional to a preselected latency value. The apparatus may therefore apply a forward error correction, FEC, scheme which complies with the ITU-T G.709 standard for OTN but which has a lower latency, acceptable for CPRI signals.

In an embodiment, the framer is arranged to calculate respective bit-interleaved parity, BIP, bytes for the payload including both communications signals of the first type and the second type.

In an embodiment, the buffer is arranged to operate using a local clock.

In an embodiment, the communications network transmitter is arranged to receive a value of a delay applied at another location in a communications network comprising the optical link. The time for which each second communications signal is buffered for is adjusted in proportion to said delay.

In an embodiment, the value of said delay is received in a precision timing protocol signal according to IEEE 1588.

A sixth aspect of the invention provides a computer program comprising instructions which, when executed on at least one processor, cause the at least one processor to carry out any of the above steps of the method of encapsulating digital communications signals for transmission on a communications link.

A seventh aspect of the invention provides a data carrier having computer readable instructions embodied therein. The said computer readable instructions are for providing access to resources available on a processor. The computer readable instructions comprise instructions to cause the processor to perform any of the above steps of the method of encapsulating digital communications signals for transmission on a communications link.

In an embodiment, the data carrier is a non-transitory data carrier.

Embodiments of the invention will now be described, by way of example only, with reference to the accompanying drawings.

DETAILED DESCRIPTION

The same reference numbers will used for corresponding features in different embodiments.

Figure 1:
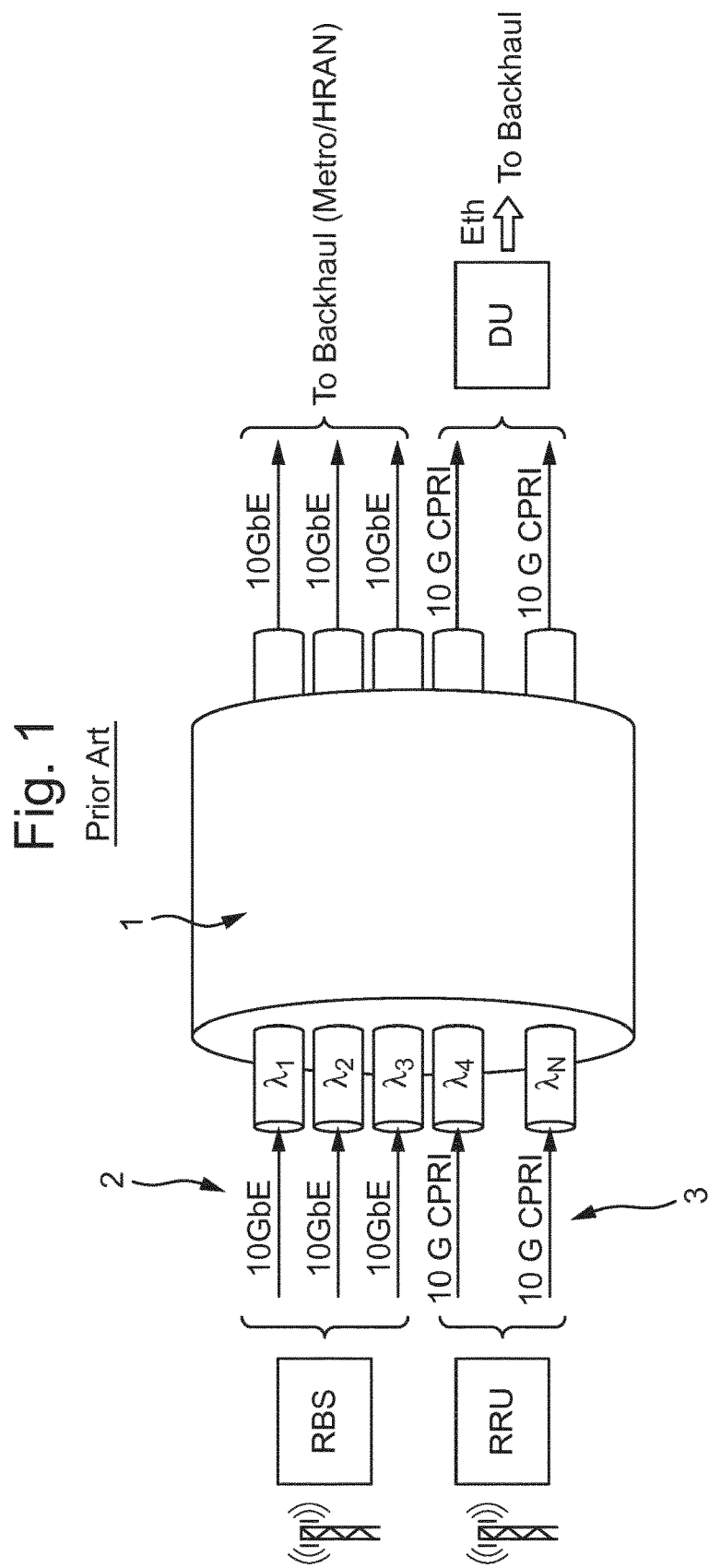
FIG. 1 illustrates part of a prior art communications network transporting mobile backhaul (Ethernet, 10 GbE, over WDM) and fronthaul (CPRI over WDM) in different optical channels of the same WDM signal.

FIG. 1 illustrates how a common fibre infrastructure 1 may be used to transport both backhaul traffic, for example Ethernet over WDM, and fronthaul traffic using CPRI over WDM, in different optical channels of the same WDM signal. A first group of optical channels 2 is used to connect a set of RBSs to the backhaul segment (High Radio Access Network, HRAN, or Metro) by transporting 10 GbE clients, one per optical channel. A second group of optical channels 3 is used to connect RRUs to DUs by transporting CPRI flows at 9.8304 Gbps, equal to CPRI option 7 bit rate, using the method described in PCT/EP2014/052056. The output of the DUs can then be transmitted over Ethernet to the remaining part of the backhaul area.

Figure 2:
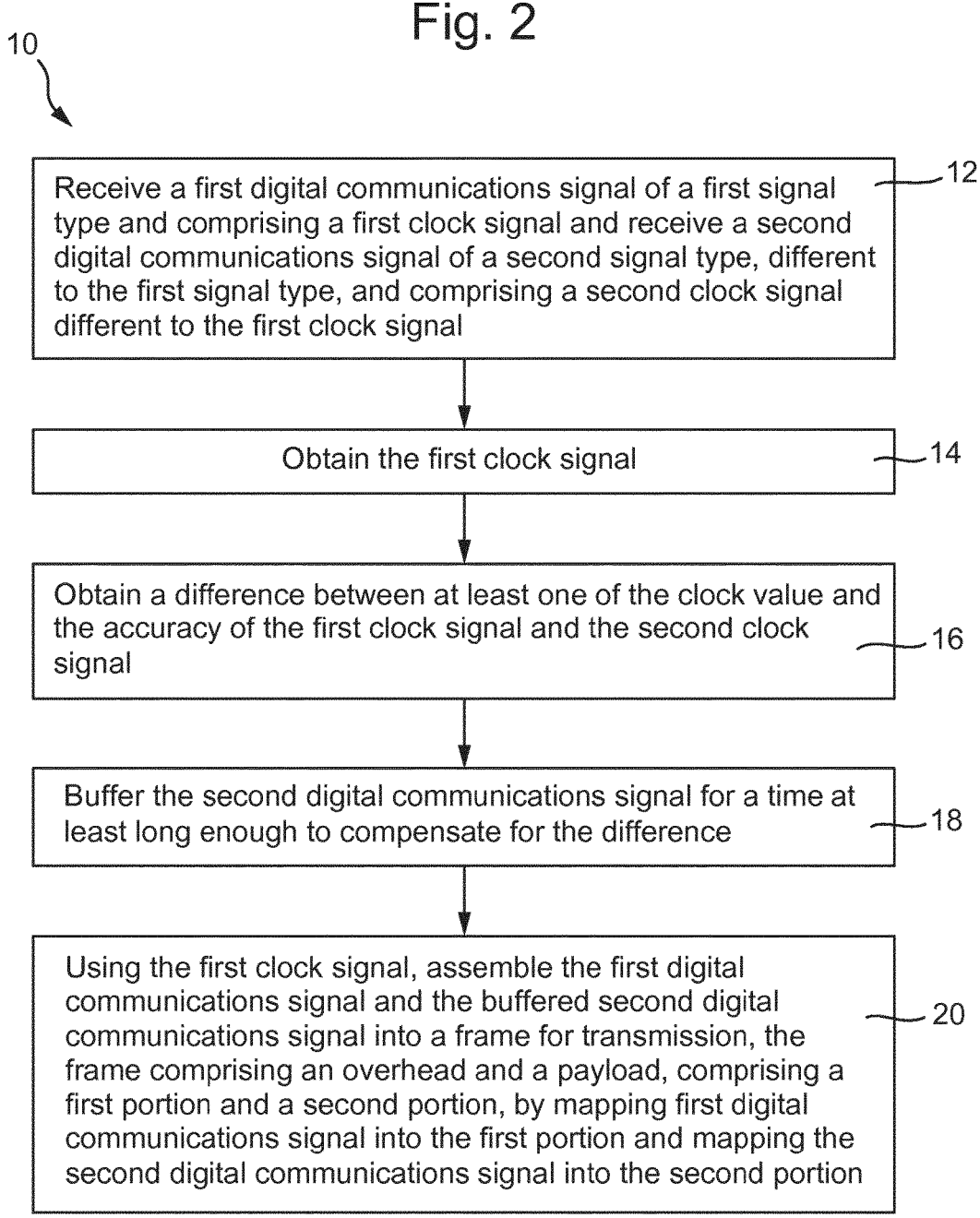
FIG. 2 shows the steps of a method according to a first embodiment of the invention of encapsulating digital communications signals for transmission on a communications link.

Referring to FIG. 2, a first embodiment of the invention provides a method 10 of encapsulating digital communications signals for transmission on a communications link.

The method comprises steps a. to d., as follows. Step a. comprises receiving a first digital communications signal of a first signal type and receiving a second digital communications signal of a second signal type, different to the first signal type 12. The first digital communications signal comprises a first clock signal and the second digital communications signal comprises a second clock signal, different to the first clock signal. Each clock signal has a respective clock value and accuracy. As will be well known to the skilled person, clock values are usually defined in Hz, or some multiple Hz units, and clock accuracy is usually defined in parts per million, ppm.

Step b. comprises obtaining the first clock signal 14. Step c. comprises obtaining a difference between the clock value of the first clock signal and the clock value of the second clock signal, and/or between the accuracy of the first clock signal and accuracy of the second clock signal 16. Step c. also comprises buffering the second digital communications signal for a time at least long enough to compensate for the difference. So after buffering, the second digital communications signal is synchronous with the first digital communications signal.

Step d. comprises assembling the first digital communications signal and the buffered second digital communications signal into a frame for transmission 20. The frame comprises an overhead and a payload, comprising a first portion and a second portion. The first digital communications signal is mapped into the first portion and the second digital communications signal is mapped into the second portion. Step d. is performed using the first clock signal, so the entire frame is synchronous with the first digital communications signal, and no jitter is introduced onto the first digital communications signal.

Figure 3:
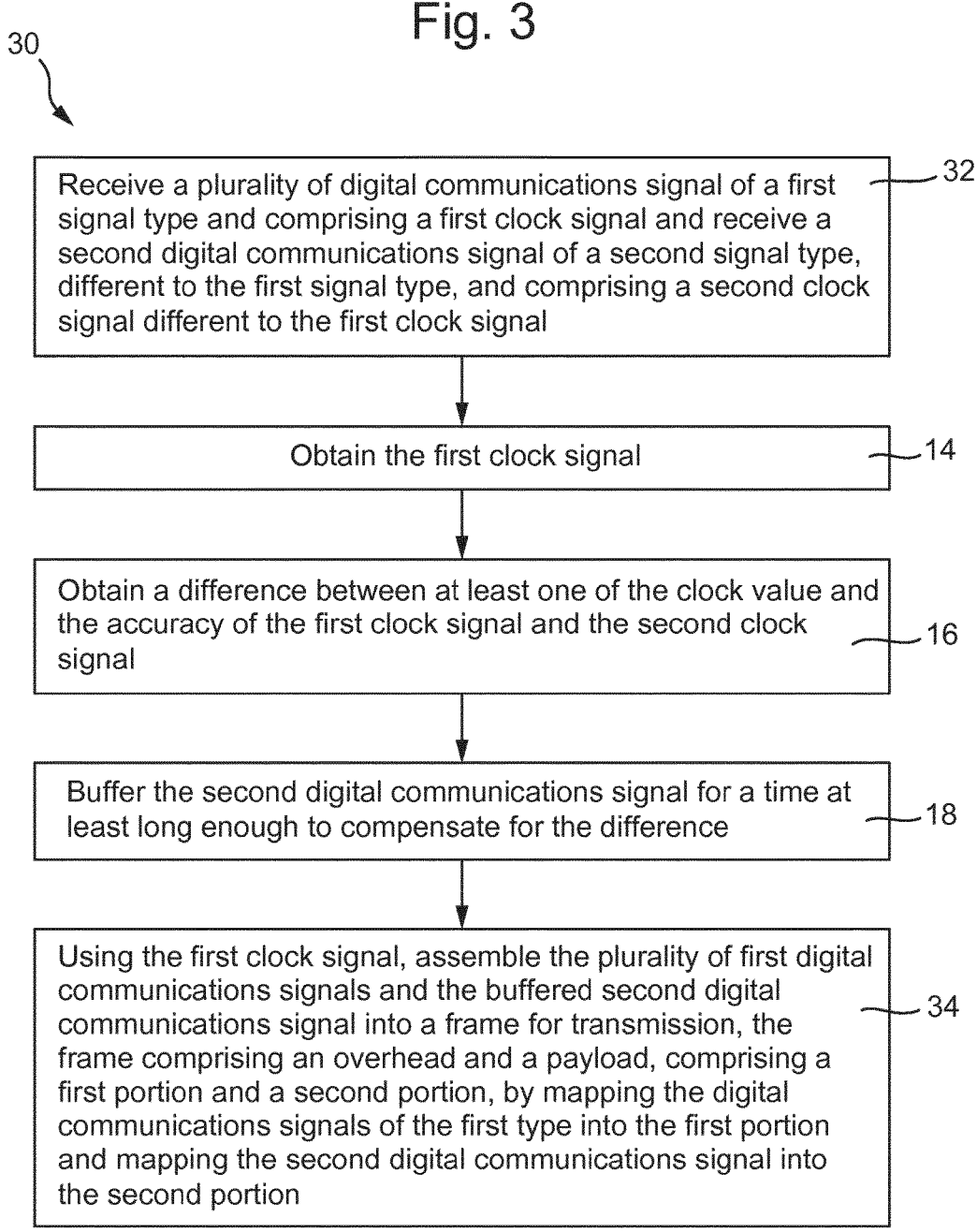
FIG. 3 shows the steps of a method according to a second embodiment of the invention of encapsulating digital communications signals for transmission on a communications link.

In a method 30 according to a second embodiment, shown in FIG. 3, step a. comprises receiving a plurality of digital communications signals of a first type 32. In step d. the plurality of digital communications signals of the first type are mapped into the first portion of the frame 32.

Figure 4:
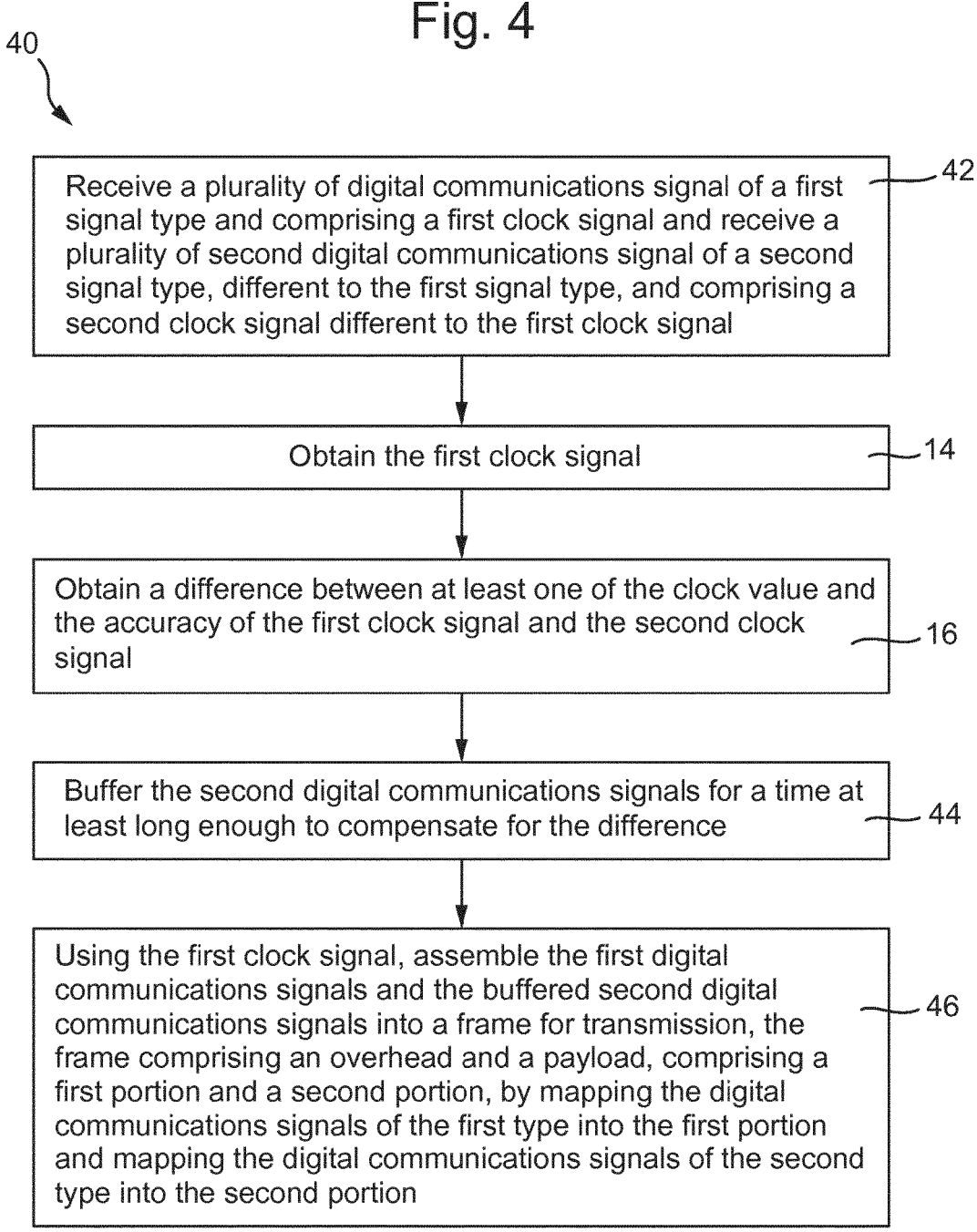
FIG. 4 shows the steps of a method according to a third embodiment of the invention of encapsulating digital communications signals for transmission on a communications link.

In a method 40 according to a third embodiment, shown in FIG. 4, step a. comprises receiving a plurality of digital communications signals of a first type and receiving a plurality of digital communications signals of a second type 42. In step c. the plurality of digital communications signals of the second type are buffered 44. In step d. the plurality of digital communications signals of the first type are mapped into the first portion of the frame and the plurality of digital communications signals of the second type are mapped into the second portion of the frame 46.

In a fourth embodiment, described with reference to FIG. 3, the digital communications signals of the first type have a first traffic bit rate and the second digital communications signal has a second traffic bit rate, different to the first traffic bit rate. The digital communications signals of the first type may each have a different traffic bit rate, which may be different to the second traffic bit rate.

In a fifth embodiment, described with reference to FIG. 4, the digital communications signals of the first type have a first traffic bit rate and the digital communications signals of the second type have a second traffic bit rate, different to the first traffic bit rate. The digital communications signals of the first type may each have a different traffic bit rate, which may be different to the second traffic bit rate.

In a sixth embodiment, described with reference to FIG. 2, the first digital communications signal has a first latency requirement and the second digital communications signal has a second latency requirement, less stringent than the first latency requirement.

In a seventh embodiment, described with reference to FIG. 2, in step d. the first digital communications signal is mapped into the first portion of the frame using the following steps i. to v.:

i. performing data recovery on each digital communications signal of the first signal type to obtain line coded digital communications traffic;
   ii. decoding the input digital communications traffic to obtain information bits and non-information bits;
   iii. removing the non-information bits;
   iv. adding service channel bits for monitoring or maintenance; and
   v. mapping the service channel bits and information bits into the first portion of the frame.

Each of steps ii. to v. is performed using the first clock signal.

The first clock signal may be obtained by performing clock recovery in step i. or it may obtained from a digital unit which transmitted the digital communications signal of the first signal type. The second digital communications signal is mapped into the second portion of the frame using the Generic Framing Procedure, GFP, according to ITU-T Recommendation G.7041.

Figure 5:
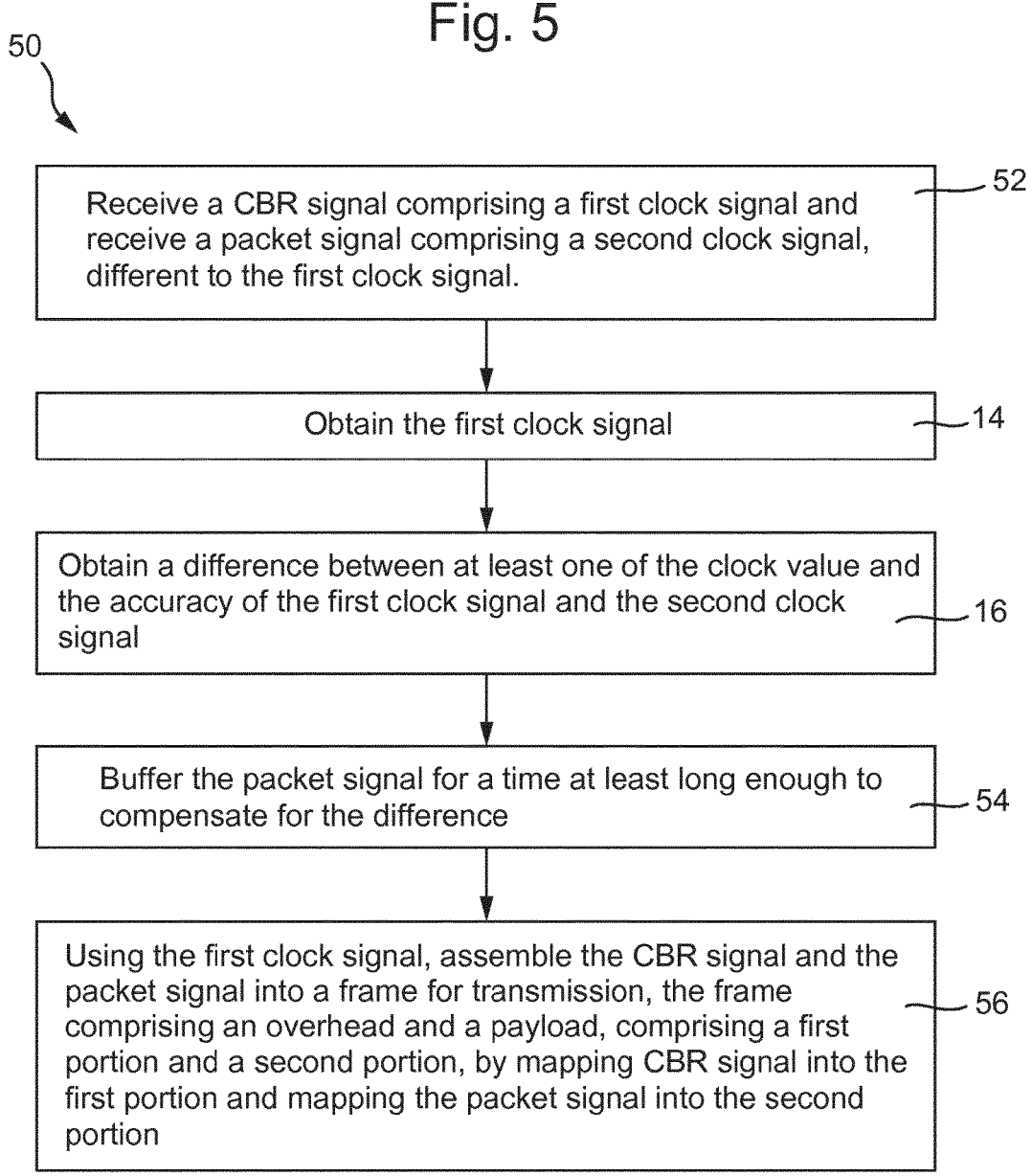
FIG. 5 shows the steps of a method according to an eighth embodiment of the invention of encapsulating digital communications signals for transmission on a communications link.

An eighth embodiment of the invention provides a method 50 of encapsulating digital communications signals for transmission on a communications link having the steps shown in FIG. 5.

The method comprises steps a. to d., as follows. Step a. comprises receiving a CBR signal and receiving a packet signal 52. The CBR signal comprises a first clock signal and the packet signal comprises a second clock signal, different to the first clock signal. Each clock signal has a respective clock value and accuracy.

Step b. comprises obtaining the first clock signal 54. Step c. comprises obtaining a difference between at least one of the clock values of the first and second clock signals and the accuracies of the first and second clock signals 16. Step c. also comprises buffering the packet signal for a time at least long enough to compensate for the difference. So after buffering, the packet signal is synchronous with the CBR signal.

Step d. comprises assembling the CBR signal and the buffered packet signal into a frame for transmission 20. The frame comprises an overhead and a payload, comprising a first portion and a second portion. The CBR signal is mapped into the first portion and the packet signal is mapped into the second portion. Step d. is performed using the CBR clock signal, so the entire frame is synchronous with the CBR signal, and no jitter is introduced onto the CBR signal.

Figure 6:
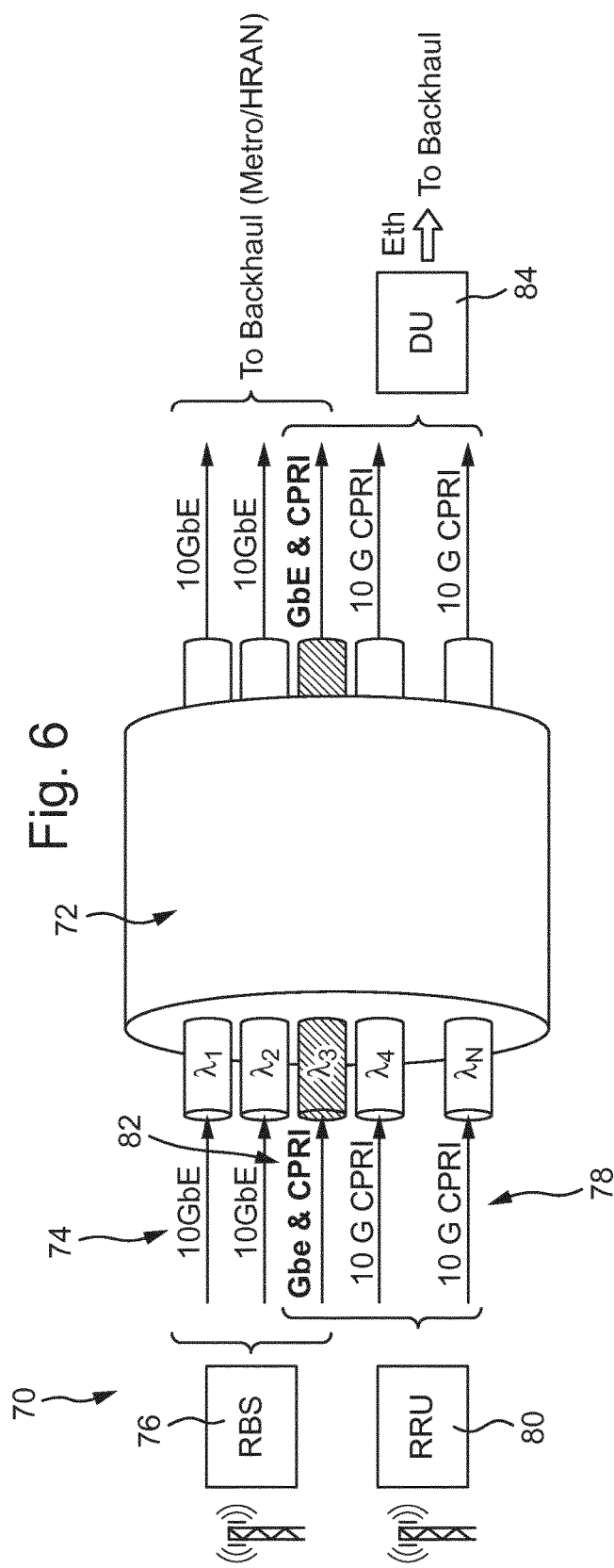
FIG. 6 illustrates Ethernet and CPRI signals framed according to the method according to a tenth embodiment of the invention being transported over a single optical channel of a WDM signal.

Referring to FIG. 6, a ninth embodiment of the invention provides a method of encapsulating digital communications signals for transmission on communications link in the form of an optical link. The method comprises steps a. to d., as follows.

Step a. comprises receiving a CPRI signal and receiving a Gigabit Ethernet, GbE, signal 52. The CPRI signal comprises a CPRI clock signal and the Ethernet signal comprises an Ethernet clock signal, different to the CPRI clock signal. Each clock signal has a respective clock value and accuracy.

Step b. comprises obtaining the CPRI clock signal 54. This may be done by recovering the CPRI clock signal from the CPRI signal or by obtaining the CPRI clock signal from a digital unit, DU, which transmitted the CPRI signal. The Ethernet clock signal is recovered from the Ethernet signal.

Step c. comprises obtaining a difference between the clock value of the CPRI clock signal and the Ethernet clock signal 16. Step c. also comprises buffering the Ethernet packets for a time at least long enough to compensate for the difference. So after buffering, the Ethernet signal is synchronous with the CPRI signal.

Step d. comprises assembling the CPRI signal and buffered Ethernet packets into a frame for transmission 20. The frame comprises an overhead and a payload, comprising a first portion and a second portion. The CPRI signal is mapped into the first portion and the Ethernet packets are mapped into the second portion. Step d. is performed using the CPRI clock signal, so the entire frame is synchronous with the CPRI signal, and no jitter is introduced onto the CPRI signal.

The CPRI signal is mapped into the first portion of the frame using the following steps i. to v.:

i. performing data recovery on the CPRI signal to obtain line coded digital communications traffic;
   ii. decoding the input digital communications traffic to obtain information bits and non-information bits;
   iii. removing the non-information bits;
   iv. adding service channel bits for monitoring or maintenance; and
   v. mapping the service channel bits and information bits into the first portion of the frame.

Each of steps ii. to v. is performed using the CPRI clock signal obtained in step b. The CPRI clock signal may alternatively be obtained by additionally performing clock recovery in step i.

The buffered Ethernet packets are mapped into the frame using the Generic Framing Procedure, GFP, defined in ITU-T Recommendation G.7041.

FIG. 6 illustrates a hybrid transport link 72 comprising an optical channel, $\lambda_3$, 82 carrying both CPRI and GbE digital communications signals, encapsulated using the method of a tenth embodiment of the invention. A first set of optical channels, $\lambda_1$ and $\lambda_2$, is used to transport 10 GbE traffic originated by radio base stations, RBS 76. A second set of optical channels, $\lambda_4$ to $\lambda_N$ is used to transport 10G CPRI traffic between remote radio units, RRU, 80 and digital units, DU, 84.

The third optical channel, $\lambda_3$, is used to transport a mix of GbE and 2.5G CPRI traffic, encapsulated as described above with reference to FIGS. 3 and 4.

The CPRI signals bit rate and the digital communications signals of the second type have a second traffic bit rate, different to the first traffic bit rate. The digital communications signals of the first type may each have a different traffic bit rate, which may be different to the second traffic bit rate.

Various combinations of bit rates for the CPRI and GbE signals can be used, depending on the optical bit rate of the optical channel. For example: two GbE signals, one 2.4576 Gbit/s CPRI signal and one 4.9152 Gbit/s CPRI signal can be mapped into a frame for transmission on a 10 Gbit/s optical channel; one 10 GbE and three 9.8304 Gbit/s CPRI signals can be mapped into a frame for transmission on a 40 Gbit/s optical channels; or four 10 GbE and six 9.8304 Gbit/s CPRI signals can be mapped into a frame for transmission on a 100 Gbit/s optical channel. It will be appreciated that many other combinations are possible.

In a method according to an eleventh embodiment of the invention of encapsulating digital communications signals for transmission on a communications link, the frame comprises at least three timeslots. The first portion of the payload comprises at least a first timeslot and the second portion of the payload comprises at least a second timeslot. The frame overhead comprises a third timeslot.

Figure 7:
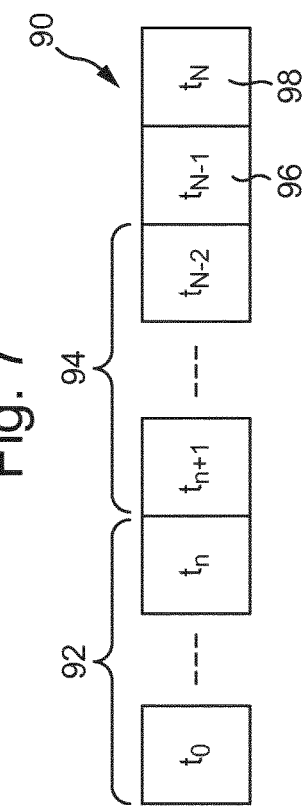
FIG. 7 illustrates a frame for use in a method according to twelfth embodiment of the invention.

Referring to FIG. 7, in a twelfth embodiment of the invention the frame comprises a plurality, N, of timeslots, $t_1$-$t_N$. The first portion 92 of the payload comprises a plurality of timeslots, $t_1$ to $t_n$. The second portion 94 of the payload comprises a plurality of timeslots, $t_{n+1}$ to $t_{N-2}$. The payload also comprises a timeslot, $t_{N-1}$, 96 for receiving control characters and/or bits of a digital communications signal which cannot be mapped within a capacity of a respective one of the first portion and the second portion. The overhead 98 comprises a further timeslot, $t_N$.

The method comprises allocating timeslots to the first portion 92 and to the second portion 94 in proportion to a respective weight of traffic of the communications signals of each of the first and second signal types.

Figure 8:
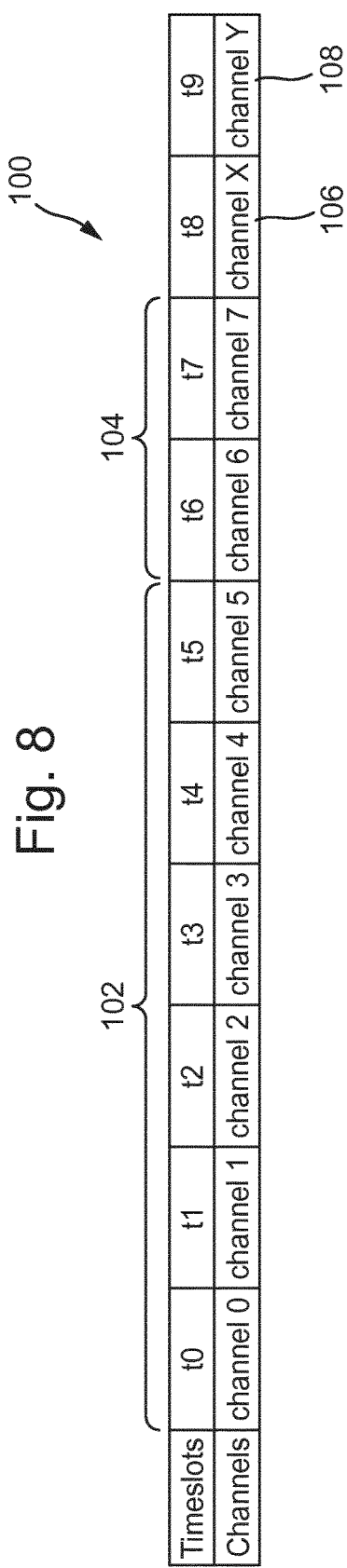
FIG. 8 illustrates a frame for use in a method according to a thirteenth embodiment of the invention.

FIG. 8 illustrates a frame 100 for use in a method according to a thirteenth embodiment of the invention of encapsulating digital communications signals for transmission on a communications link, in the form of an optical link.

In this embodiment, two GbE signals, one 2.4576 Gbit/s CPRI signal and one 4.9152 Gbit/s CPRI signal are mapped into the frame 100 for transmission on a 9.8304 Gbit/s optical channel.

The frame has ten timeslots, t0 to t9, which may also be referred to as "channels" 0 to 6, X and Y. Each of the timeslots can accommodate $\frac{1}{10}^{th}$ of the 9.8403 Gb capacity of the optical channel, i.e. 0.98403 Gb. Timeslots t0 to t5 are allocated to the first portion of the payload, timeslots t6 and t7 are allocated to the second portion of the payload, timeslot t8 is also allocated to the payload and timeslot t9 is allocated to the overhead. The number timeslots which are allocated to CPRI signals and to Ethernet signals depends on the relative weight of traffic of each type expected to be transmitted on the optical link. Network configuration of the network that the optical link is part of may also be taken into consideration. It will be appreciated that how the timeslots allocated to each signal type, the control character and additional bits, and the overhead may be provided in a different arrangement to that shown in FIG. 8.

In step d., the 2.4576 Gbit/s CPRI signal is mapped into timeslots t0 and t1, and the 4.9152 Gbit/s CPRI signal is mapped into timeslots t2 to t5. The control characters, also known as 'K codes', of the CPRI signals are mapped into timeslot t8. A first of the GbE signals is mapped into timeslot t6 and bit 6 of timeslot t8, and the second GbE signal is mapped into timeslot t7 and bit 7 of timeslot t8. Since each timeslot has a capacity of 0.98403 Gb, there are some bits of each of the GbE signals which cannot be mapped into the capacity of the allocated timeslot. These additional bits are mapped into timeslot t8. The overhead for all of the signals, namely frame alignment word, FEC coding and operation and maintenance channel traffic, are mapped into timeslot t9.

Figure 9:
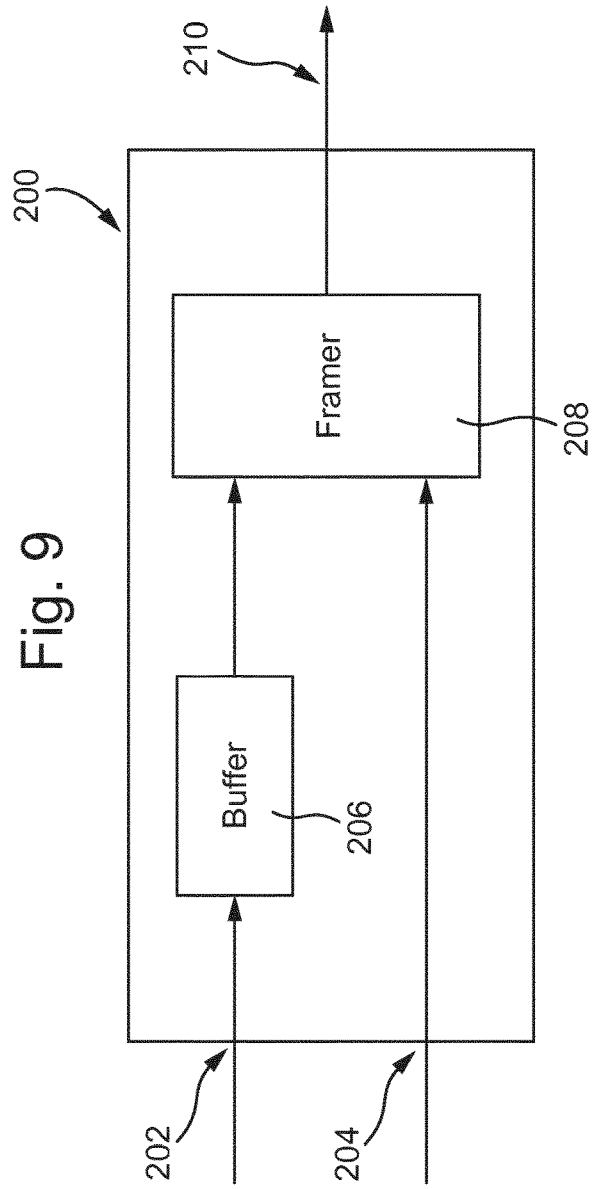
FIG. 9 is a schematic representation of encapsulation apparatus according to a fourteenth embodiment of the invention.

Referring to FIG. 9, a fourteenth embodiment of the invention provides encapsulation apparatus 200 for a communications network transmitter. The encapsulation apparatus comprises an input 204 arranged to receive a first digital communications signal of a first signal type and an input 202 arranged to receive a second digital communications signal of a second signal type, different to the first signal type. The first digital communications signal has a first clock signal and the second digital communications signal has a second clock signal, which is different to the first clock signal. Each clock signal has a respective clock value and accuracy.

The encapsulation apparatus also comprises a buffer 206 and a framer 208. The buffer is arranged to buffer the second digital communications signal for a time at least long enough to compensate for a difference between the clock value of the first clock signal and the clock value of the second clock signal and/or the accuracy of the first clock signal and the accuracy of the second clock signal. The framer is arranged to receive the first digital communications signal and to receive the buffered second digital communications signal from the buffer. The framer is arranged to frame the first digital communications signal and the buffered second digital communications signal into a frame for transmission. The frame comprises an overhead and a payload, comprising a first portion and a second portion. The framer is arranged to map first digital communications signal into the first portion and to map the second digital communications signal into the second portion. The encapsulation apparatus is arranged to obtain the first clock signal and the framer is arranged to operate using the first clock signal, so the entire frame is synchronous with the first digital communications signal, and no jitter is introduced onto the first digital communications signal.

A fifteenth embodiment of the invention provides encapsulation apparatus for a communications network transmitter which has the same general structure as the encapsulation apparatus 200 of the previous embodiment. In this embodiment, the input 204 is arranged to receive a plurality of digital communications signals of the first signal type. The framer 208 is arranged to map the digital communications signals of the first signal type into the first portion of the payload.

A sixteenth embodiment of the invention provides encapsulation apparatus for a communications network transmitter which has the same general structure as the encapsulation apparatus 200 of the previous embodiment. In this embodiment, the input 204 is arranged to receive a plurality of digital communications signals of the first signal type and the input 202 is arranged to receive a plurality of digital communications signals of the second signal type. The framer 208 is arranged to map the digital communications signals of the first signal type into the first portion of the payload and to map the digital communications signals of the second signal type into the second portion of the payload.

A seventeenth embodiment of the invention provides encapsulation apparatus for a communications network transmitter which has the same general structure as the encapsulation apparatus 200 of the previous embodiment. In this embodiment, the digital communications signals of the first type have a first traffic bit rate and the second digital communications signal has a second traffic bit rate, different to the first traffic bit rate. The digital communications signals of the first type may each have a different traffic bit rate, which may be different to the second traffic bit rate. The framer 208 is arranged to map the digital communications signals of the first signal type into the first portion of the payload and to map the digital communications signals of the second signal type into the second portion of the payload.

An eighteenth embodiment of the invention provides encapsulation apparatus for a communications network transmitter which has the same general structure as the encapsulation apparatus 200 of the previous embodiment. In this embodiment, the first digital communications signal has a first latency requirement and the second digital communications signal has a second latency requirement, less stringent than the first latency requirement. The buffer 206 is arranged to buffer the second digital communications signal for a time at least long enough to compensate for a difference between at least one of the clock values of the first and second clock signals and the accuracies of the first and second clock signals. The buffering time is less than a maximum acceptable latency of the second digital communications signal.

A nineteenth embodiment of the invention provides encapsulation apparatus for a communications network transmitter which has the same general structure as the encapsulation apparatus 200 of the previous embodiment. In this embodiment, the framer 208 is arranged to map the first digital communications signal into the first portion of the frame by:
  performing data recovery on each digital communications signal of the first signal type to obtain line coded digital communications traffic;
  decoding the input digital communications traffic to obtain information bits and non-information bits;
  removing the non-information bits;
  adding service channel bits for monitoring or maintenance; and
  mapping the service channel bits and information bits into the first portion of the frame.

The framer is arranged to perform the above steps using the first clock signal.

The first clock signal may be obtained by performing clock recovery in step i. or it may obtained from a digital unit which transmitted the digital communications signal of the first signal type.

The framer 208 is arranged to map the second digital communications signal into the second portion of the frame using the Generic Framing Procedure, GFP.

A twentieth embodiment of the invention provides encapsulation apparatus for a communications network transmitter which has the same general structure as the encapsulation apparatus 200 of the previous embodiment. In this embodiment, each said first digital communications signal is a CBR signal and each second digital communications signal is a packet signal. The framer 208 is arranged to map the CBR signal into the first portion of the payload and to map the packet signal into the second portion of the payload.

Figure 10:
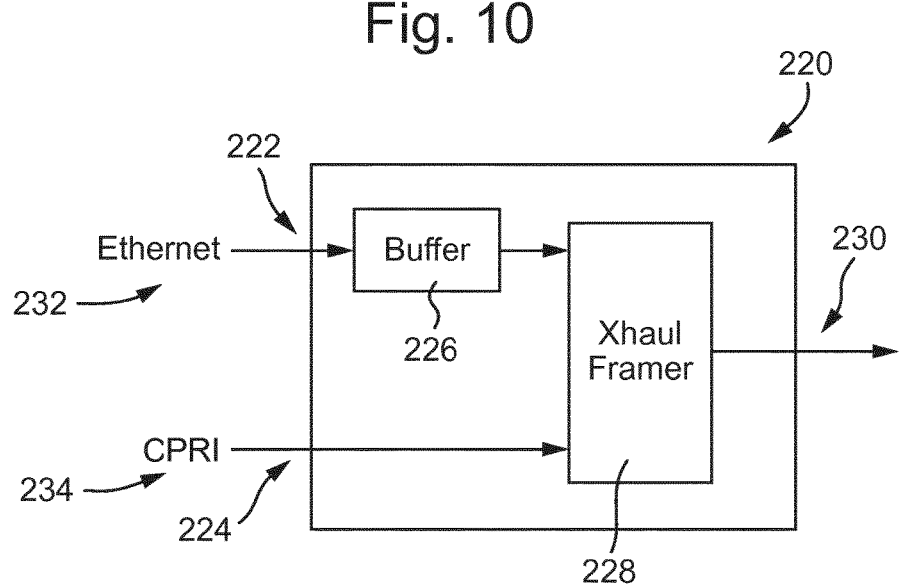
FIG. 10 is a schematic representation of encapsulation apparatus according to a twenty-first embodiment of the invention.

FIG. 10 shows encapsulation apparatus 220 according to a twenty-first embodiment of the invention. The encapsulation apparatus comprises a first input 224 arranged to receive a CPRI signal 234 and a second input 222 arranged to receive an Ethernet signal 232. The CPRI signal has a first clock signal and the Ethernet signal has a second clock signal, which is different to the first clock signal. Each clock signal has a respective clock value and accuracy.

The encapsulation apparatus also comprises a buffer 226 and a framer 228. The buffer is arranged to buffer the Ethernet signal for a time at least long enough to compensate for a difference between at least one of the clock values of the first and second clock signals and the accuracies of the first and second clock signals. The framer 228 is arranged to receive the CPRI signal and to receive the buffered Ethernet signal from the buffer. The framer is arranged to frame the CPRI signal and the buffered Ethernet signal into a frame for transmission. The frame comprises an overhead and a payload, comprising a first portion and a second portion. The framer is arranged to map the CPRI signal into the first portion by:
  performing data recovery on each digital communications signal of the first signal type to obtain line coded digital communications traffic;
  decoding the input digital communications traffic to obtain information bits and non-information bits;
  removing the non-information bits;
  adding service channel bits for monitoring or maintenance; and
  mapping the service channel bits and information bits into the first portion of the frame.

The framer is arranged to map the Ethernet signal into the second portion using the Generic Framing Procedure, GFP.

The encapsulation apparatus is arranged to obtain the first clock signal and the framer is arranged to operate using the first clock signal, so the entire frame is synchronous with the CPRI signal, and no jitter is introduced onto the CPRI signal.

Figure 11:
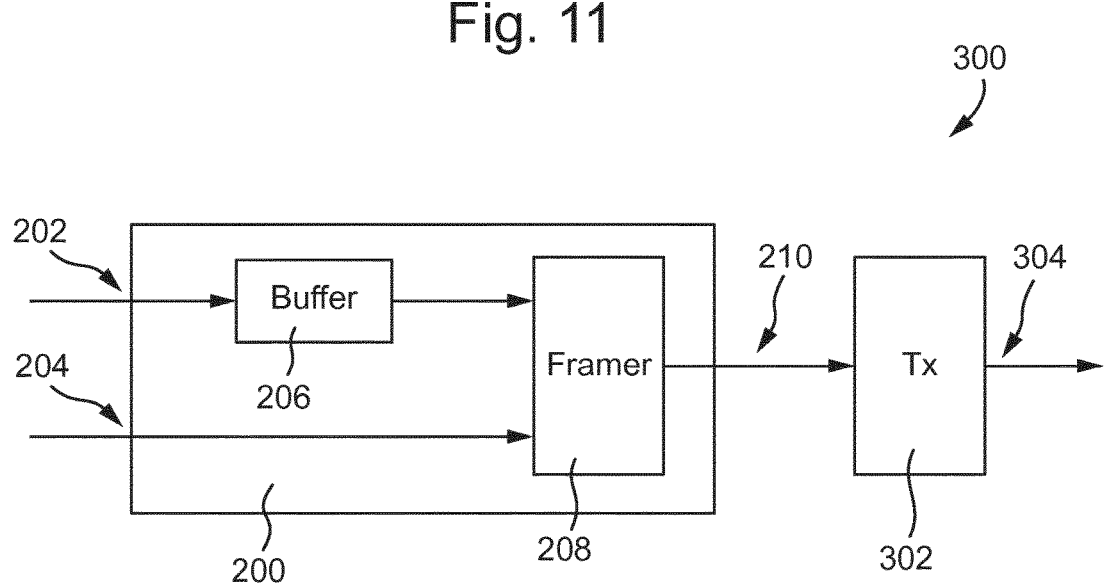
FIG. 11 is a schematic representation of a communications network transmitter according to a twenty-second embodiment of the invention.

A twenty-second embodiment of the invention provides communications network transmitter 300 as shown in FIG. 11. The communications network transmitter 300 comprises encapsulation apparatus 200 and a carrier signal transmitter 302.

The encapsulation apparatus 200 is as shown in FIG. 9 and described above according to any of the thirteenth to twentieth embodiments. It will be appreciated that the encapsulation apparatus 220 described with reference to FIG. 10 may alternatively be used. The carrier signal transmitter 302 is arranged to generate and transmit carrier signal 304 carrying the frame generated by the encapsulation apparatus 200.

In a twenty-third embodiment of the invention the carrier signal transmitter 302 is an optical transmitter arranged to generate and transmit an optical signal 304 carrying the frame generated by the encapsulation apparatus 200.

It will be appreciated that the carrier signal transmitter may alternatively be a radio transmitter arranged to generate and transmit a radio frequency signal carrying the frame or an electrical transmitter arranged to generate and transmit an electrical signal carrying the frame.

Figure 12:
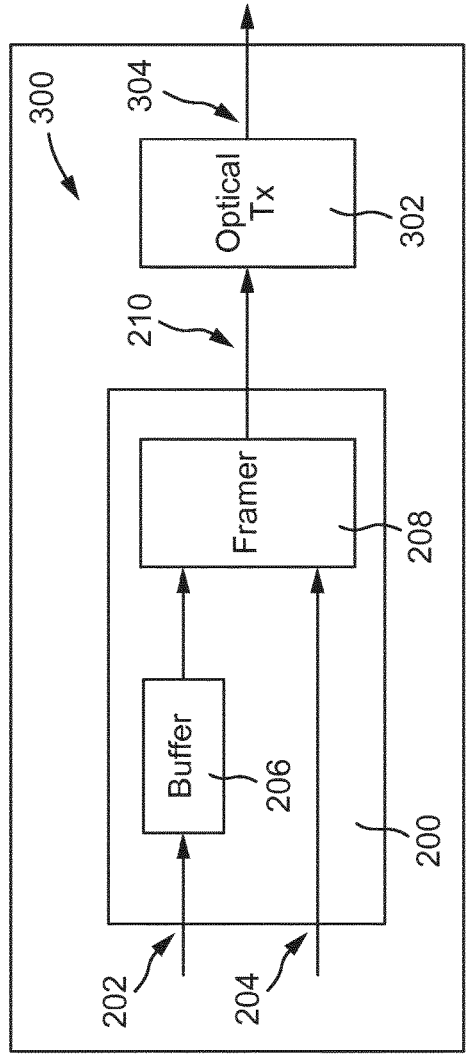
FIG. 12 is a schematic representation of a communications network node according to a twenty-fourth embodiment of the invention.

A twenty-fourth embodiment of the invention provides a communications network node 400, as shown in FIG. 12, comprising a communications network transmitter 300 as described in the previous embodiment.

Figure 13:
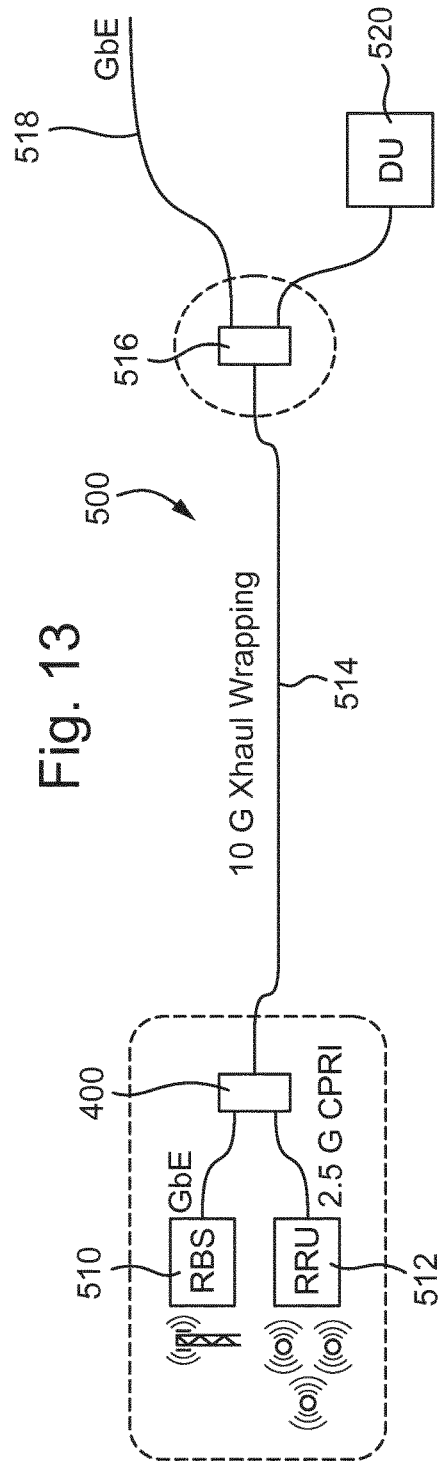
FIG. 13 is a schematic representation of a communications network according to a twenty-fifth embodiment of the invention.

A twenty-fifth embodiment of the invention provides a communications network 500 as shown in FIG. 13. The communications network 500 comprises a radio base station, RBS, 510, a remote radio unit, RRU, 512, a communications network node 400 as described in the previous embodiment, an optical link 514, an optical receiver 516, a GbE link 518 for connection to a Metro or HRAN network, and a digital unit, DU, 520.

The carrier signal transmitter 302 in this embodiment is a grey optics transmitter and the optical receiver 516 is a grey optics receiver. The optical link 514 is a single optical fibre, therefore the RBS and RRU are connected to the optical receiver 516 on a point-to-point connection using low cost grey optics.

Figure 14:
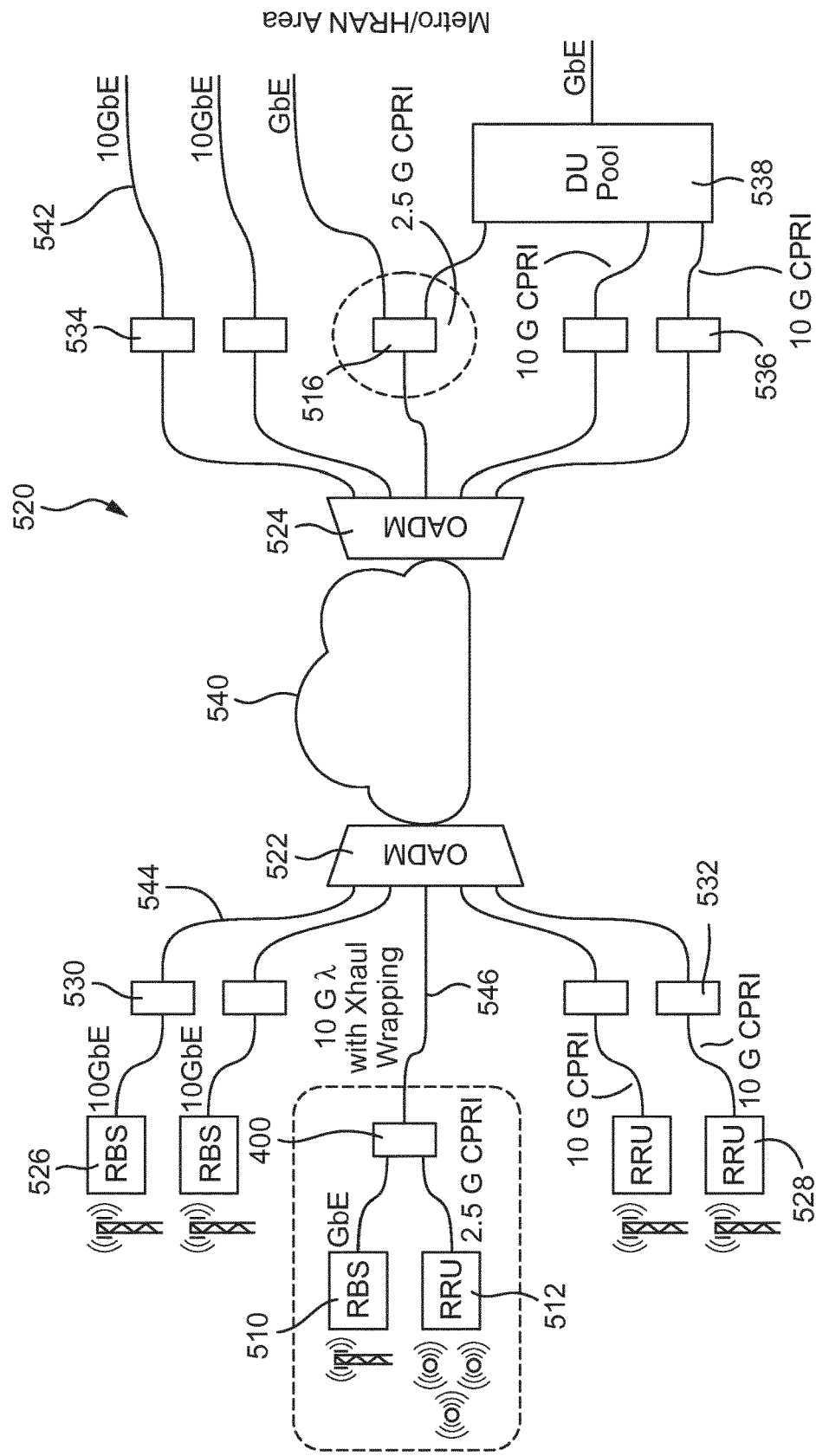
FIG. 14 is a schematic representation of a communications network according to a twenty-sixth embodiment of the invention.

A twenty-sixth embodiment of the invention provides a wavelength division multiplexing, WDM, communications network 520 as shown in FIG. 14. The communications network 520 comprises radio base stations, RBS, 510, 526, remote radio units, RRU, 512, 528, a communications network node 400 as shown in FIG. 12, optical transmitters 530, 532, optical add-drop multiplexers 522, 524, a WDM transport network 540, optical receivers 516, 534, 536 a GbE links 542 for connection to a Metro or HRAN network, and a digital unit pool, DU, 538.

Radio equipment, RBSs and RRUs are connected to a WDM multiplexer 522 via dedicated drop fibres 544, with one wavelength/optical channel per fibre. RBS 510 and RRU 512 share the same wavelength in the same drop fibre 546 without requiring additional fibres or modifications of the network topology. Communication is bidirectional so the location of eastbound transmitter is also the location for the westbound receiver and vice versa.

For sake of simplicity FIG. 14 shows a single WDM distribution node but it will be appreciated that the communications network node 400 may also be used in ring or meshed WDM networks.

A twenty-seventh embodiment of the invention provides a computer program comprising instructions which, when executed on at least one processor, cause the at least one processor to carry out any steps of the method 10, 30, 40, 50 of encapsulating digital communications signals for transmission on a communications link, as described above.

A twenty-eighth embodiment of the invention provides a data carrier having computer readable instructions embodied therein. The computer readable instructions are for providing access to resources available on a processor. The computer readable instructions comprise instructions to cause the processor to perform any of the steps of the method 10, 30, 40, 50 of encapsulating digital communications signals for transmission on a communications link, as described above.

In an embodiment, the data carrier is a non-transitory data carrier.

The invention claimed is:

1. A method of encapsulating digital communications signals for transmission on a communications link, the method comprising:
   receiving a first digital communications signal of a first signal type, the first digital communications signal comprising a first clock signal and receiving a second digital communications signal of a second signal type, different to the first signal type, the second digital communications signal comprising a second clock signal different to the first clock signal, each clock signal having a respective clock value and accuracy;
   obtaining the first clock signal;
   obtaining a difference between at least one of the clock values of the first and second clock signals and the accuracies of the first and second clock signals, and buffering only the second digital communications signal for a time at least long enough to compensate for the difference, wherein after the buffering, the second digital communications signal is synchronous with the first digital communications signal; and
   assembling the first digital communications signal and the buffered second digital communications signal into a frame for the transmission, the frame comprising an overhead and a payload, the payload comprising a first portion and a second portion, the first digital communications signal being mapped into the first portion and the second digital communications signal being mapped into the second portion,
   wherein the step of assembling is performed using the first clock signal.

2. The method as claimed in claim 1, wherein a plurality of digital communications signals of the first signal type are received and are mapped into the first portion of the payload.

3. The method as claimed in claim 1, wherein a plurality of digital communications signals of the second signal type are received and are mapped into the second portion of the payload.

4. The method as claimed in claim 2, wherein at least some of the digital communications signals have different traffic bit rates.

5. The method as claimed in claim 1, wherein the frame comprises at least four timeslots, the first portion of the payload comprising at least a first timeslot, the second portion of the payload comprising at least a second timeslot, the payload also comprising at least a third timeslot for receiving at least one of control characters and bits of a digital communications signal which cannot be mapped within a capacity of a respective one of the first portion and the second portion, and the overhead comprising a fourth timeslot.

6. The method as claimed in claim 5, further comprising allocating timeslots to the first portion and the second portion of the payload in proportion to a respective weight of traffic of the digital communications signals of each of said signal types.

7. The method as claimed in claim 1, wherein said first digital communications signal has a first latency requirement and said second digital communications signal has a second latency requirement, less stringent than the first latency requirement.

8. The method as claimed in claim 1, wherein said first digital communications signal is a continuous bit rate signal and said second digital communications signal is a packet signal.

9. The method as claimed in claim 7, wherein said first digital communications signal is a common public radio interface (CPRI) signal and said second digital communications signal is an Ethernet signal.

10. An encapsulation apparatus for a communications network transmitter, the encapsulation apparatus comprising:
    at least one input arranged to receive a first digital communications signal of a first signal type, the first digital communications signal comprising a first clock signal, and a second digital communications signal of a second signal type, different to the first signal type, the second digital communications signal comprising a second clock signal different to the first clock signal, each clock signal having a respective clock value and accuracy;
    a buffer arranged to buffer only the second digital communications signal for a time at least long enough to compensate for a difference between at least one of the clock values of the first and second clock signals and the accuracies of the first and second clock signals, wherein after the buffering, the second digital communications signal is synchronous with the first digital communications signal; and a framer arranged to;
    receive the first digital communications signal,
    receive the buffered second digital communications signal from the buffer,
    frame the first digital communications signal and the buffered second digital communications signal into a frame for transmission, the frame comprising an overhead and a payload, the payload comprising a first portion and a second portion, and map the first digital communications signal into the first portion and map the buffered second digital communications signal into the second portion,
wherein the encapsulation apparatus is arranged to obtain the first clock signal and the framer is further arranged to operate using the first clock signal.

11. The encapsulation apparatus as claimed in claim 10, wherein the at least one input is arranged to receive a plurality of digital communications signals of the first signal type and the framer is arranged to map said plurality of digital communications signals of the first signal type into the first portion of the payload.

12. The encapsulation apparatus as claimed in claim 10, wherein the at least one input is arranged to receive a plurality of digital communications signals of the second signal type and the framer is arranged to map said plurality of digital communications signals of the second signal type into the second portion of the payload.

13. The encapsulation apparatus as claimed in claim 11, wherein at least some of the digital communications signals have different traffic bit rates.

14. The encapsulation apparatus as claimed in claim 10, wherein the frame comprises at least four timeslots, the first portion of the payload comprising at least a first timeslot, the second portion of the payload comprising at least a second timeslot, the payload also comprising at least a third timeslot for receiving at least one of control characters and bits of a digital communications signal which cannot be mapped within a capacity of a respective one of the first portion and the second portion, and the overhead comprising a fourth timeslot.

15. The encapsulation apparatus as claimed in claim 10, wherein said first digital communications signal has a first latency requirement and said second digital communications signal has a second latency requirement, less stringent than the first latency requirement.

16. The encapsulation apparatus as claimed in claim 10, wherein said first digital communications signal is a continuous bit rate signal and said second digital communications signal is a packet signal.

17. The encapsulation apparatus as claimed in claim 15, wherein said first digital communications signal is a common public radio interface (CPRI) signal and said second digital communications signal is an Ethernet signal.

18. A communications network transmitter comprising:
the encapsulation apparatus as claimed in claim 10; and
a carrier signal transmitter arranged to generate and transmit a carrier signal carrying the frame for transmission.

19. A computer program comprising instructions which, when executed on at least one processor, cause the at least one processor to carry out the method according to claim 1.

20. The method as claimed in claim 1, wherein mapping of the first digital communications signal into the first portion of the payload comprises:
performing data recovery on the first digital communications signal to obtain digital communications traffic;
decoding the digital communications traffic to obtain information bits and non-information bits;
removing the non-information bits from the first digital communications signal; and
mapping the information bits into the first portion of the frame.

* * * * *